United States Patent
Miller et al.

(10) Patent No.: US 12,494,997 B2
(45) Date of Patent: Dec. 9, 2025

(54) LINKING RESOURCE INSTANCES TO VIRTUAL NETWORK IN PROVIDER NETWORK ENVIRONMENTS

(71) Applicant: Amazon Technologies, Inc., Seattle, WA (US)

(72) Inventors: Kevin Christopher Miller, Herndon, VA (US); Andrew Bruce Dickinson, Seattle, WA (US); Eric Wayne Schultze, Bellevue, WA (US); Ian Roger Searle, Bellevue, WA (US); Shane Ashley Hall, Kirkland, WA (US); Deepak Mohan, Bellevue, WA (US); David Brian Lennon, Reston, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/057,670

(22) Filed: Nov. 21, 2022

(65) Prior Publication Data
US 2023/0171188 A1    Jun. 1, 2023

Related U.S. Application Data

(60) Continuation of application No. 16/530,881, filed on Aug. 2, 2019, now Pat. No. 11,509,577, which is a
(Continued)

(51) Int. Cl.
*H04L 45/586*    (2022.01)
*H04L 9/40*    (2022.01)
(Continued)

(52) U.S. Cl.
CPC ............ *H04L 45/586* (2013.01); *H04L 45/74* (2013.01); *H04L 45/745* (2013.01);
(Continued)

(58) Field of Classification Search
CPC ......... G06F 11/008; G06F 2009/45595; G06F 11/07; G06F 9/455; G06F 9/45558;
(Continued)

(56) References Cited

U.S. PATENT DOCUMENTS

| 1,060,190 A | 4/1913 | Kellner et al. |
| 6,240,402 B1 | 5/2001 | Lynch-Aird |

(Continued)

FOREIGN PATENT DOCUMENTS

| CN | 102598591 | 7/2012 |
| EP | 1298853 | 4/2003 |

OTHER PUBLICATIONS

Amazon Web Service, "Amazon Virtual Private Cloud User Guide", API Version, Jun. 15, 2014, pp. 1-162.
(Continued)

*Primary Examiner* — Yee F Lam
(74) *Attorney, Agent, or Firm* — Robert C. Kowert; Kowert, Hood, Munyon, Rankin & Goetzel, P.C.

(57) ABSTRACT

Methods and apparatus that allow clients to connect resource instances to virtual networks in provider network environments via private IP. Via private IP linking methods and apparatus, a client of a provider network can establish private IP communications between the client's resource instances on the provider network and the client's resource instances provisioned in the client's virtual network via links from the private IP address space of the virtual network to the private IP address space of the provider network. The provider network client resource instances remain part of the client's provider network implementation and may thus also communicate with other resource instances on the provider network and/or with entities on external networks via public IP while communicating with the virtual network resource instances via private IP.

20 Claims, 15 Drawing Sheets

Related U.S. Application Data continuation of application No. 15/823,185, filed on Nov. 27, 2017, now Pat. No. 10,374,949, which is a division of application No. 14/542,513, filed on Nov. 14, 2014, now Pat. No. 9,832,118.

(51) Int. Cl.
*H04L 45/74* (2022.01)
*H04L 45/745* (2022.01)

(52) U.S. Cl.
CPC ...... *H04L 63/0236* (2013.01); *H04L 63/0272* (2013.01); *H04L 63/101* (2013.01)

(58) Field of Classification Search
CPC ....... H04L 45/48; H04L 45/42; H04L 45/586; H04L 69/40; H04L 43/04; H04L 41/0631; H04L 61/103; H04L 41/147; H04L 43/10; H04L 43/0852; H04L 45/16; H04L 45/38; H04L 41/0856; H04L 41/0893; H04L 49/70; H04L 63/0272; H04L 12/4641; H04L 63/101; H04L 45/745; H04L 61/5007; G06N 20/00
See application file for complete search history.

(56) References Cited

U.S. PATENT DOCUMENTS

| | | | |
|---|---|---|---|
| 6,836,462 B1 | 12/2004 | Albert | |
| 7,325,140 B2 | 1/2008 | Carley | |
| 7,505,962 B2 | 3/2009 | Shariff et al. | |
| 7,779,034 B2 | 8/2010 | Pedersen et al. | |
| 7,792,113 B1 | 9/2010 | Foschiano | |
| 7,937,438 B1 | 5/2011 | Miller et al. | |
| 7,945,640 B1 | 5/2011 | VanTine | |
| 7,953,865 B1 | 5/2011 | Miller et al. | |
| 7,991,859 B1 | 8/2011 | Miller et al. | |
| 8,117,289 B1 | 2/2012 | Miller et al. | |
| 8,131,852 B1 | 3/2012 | Miller et al. | |
| 8,201,237 B1 | 6/2012 | Doane et al. | |
| 8,224,971 B1 | 7/2012 | Miller et al. | |
| 8,230,050 B1 | 7/2012 | Brandwine et al. | |
| 8,239,538 B2 | 8/2012 | Zhang et al. | |
| 8,312,129 B1 | 11/2012 | Miller et al. | |
| 8,345,692 B2 | 1/2013 | Smith | |
| 8,352,941 B1 | 1/2013 | Protopopov et al. | |
| 8,369,345 B1 | 2/2013 | Raghunathan et al. | |
| 8,751,691 B1 | 6/2014 | Brandwine et al. | |
| 9,319,272 B1 | 4/2016 | Brandwine | |
| 9,349,134 B1 | 5/2016 | Adams | |
| 9,356,866 B1* | 5/2016 | Sivaramakrishnan | .. H04L 45/50 |
| 9,807,057 B1 | 10/2017 | Deb | |
| 9,948,579 B1* | 4/2018 | Sivaramakrishnan | ...................... H04L 67/1097 |
| 10,212,161 B1 | 2/2019 | Schaefer | |
| 10,218,613 B2 | 2/2019 | Cohn | |
| 10,225,146 B2 | 3/2019 | Miller | |
| 10,256,993 B2 | 4/2019 | Miller | |
| 10,320,644 B1 | 6/2019 | Chen | |
| 10,361,911 B2 | 7/2019 | Brandwine et al. | |
| 10,367,753 B2 | 7/2019 | Schultze | |
| 10,389,608 B2 | 8/2019 | Searle | |
| 10,397,344 B2 | 8/2019 | Akers | |
| 10,419,287 B2 | 9/2019 | Miller et al. | |
| 10,484,297 B1 | 11/2019 | McClenahan | |
| 10,498,693 B1 | 12/2019 | Strauss | |
| 10,530,657 B2 | 1/2020 | Brandwine et al. | |
| 10,574,534 B2 | 2/2020 | Brandwine et al. | |
| 10,593,009 B1 | 3/2020 | Surani | |
| 10,644,933 B2 | 5/2020 | Cohn | |
| 10,728,089 B2 | 7/2020 | Brandwine | |
| 10,749,808 B1 | 8/2020 | MacCarthaigh | |
| 10,749,936 B1 | 8/2020 | Cohn et al. | |
| 10,868,715 B2 | 12/2020 | Brandwine | |
| 10,917,322 B2 | 2/2021 | Russell | |
| 10,951,586 B2 | 3/2021 | Cohn et al. | |
| 2003/0084104 A1 | 5/2003 | Salem et al. | |
| 2003/0140142 A1* | 7/2003 | Marples | ............. H04L 63/0272 709/225 |
| 2005/0198244 A1 | 9/2005 | Eilam et al. | |
| 2005/0289648 A1 | 12/2005 | Grobman | |
| 2006/0251088 A1 | 11/2006 | Thubert et al. | |
| 2007/0074191 A1 | 3/2007 | Geisinger | |
| 2007/0078988 A1 | 4/2007 | Miloushev et al. | |
| 2008/0059557 A1 | 3/2008 | DeSantis | |
| 2008/0140846 A1 | 6/2008 | Rehm | |
| 2008/0225875 A1 | 9/2008 | Wray et al. | |
| 2008/0244579 A1 | 10/2008 | Muller | |
| 2008/0320583 A1 | 12/2008 | Sharma | |
| 2009/0083445 A1 | 3/2009 | Ganga | |
| 2009/0106405 A1 | 4/2009 | Mazarick | |
| 2009/0199177 A1 | 8/2009 | Edwards | |
| 2009/0249472 A1 | 10/2009 | Litvin | |
| 2009/0276771 A1 | 11/2009 | Nickolov et al. | |
| 2010/0057831 A1 | 3/2010 | Williamson | |
| 2010/0094990 A1 | 4/2010 | Ben-Yehuda et al. | |
| 2010/0246443 A1 | 9/2010 | Cohn et al. | |
| 2011/0075667 A1 | 3/2011 | Li et al. | |
| 2011/0320605 A1 | 12/2011 | Kramer et al. | |
| 2012/0084113 A1 | 4/2012 | Brandwine et al. | |
| 2012/0084443 A1 | 4/2012 | Theimer et al. | |
| 2012/0099602 A1 | 4/2012 | Nagapudi et al. | |
| 2013/0282994 A1 | 10/2013 | Wires et al. | |
| 2013/0329584 A1* | 12/2013 | Ghose | ................... H04L 45/586 370/252 |
| 2013/0332577 A1* | 12/2013 | Nakil | ...................... H04L 49/70 709/219 |
| 2013/0332602 A1* | 12/2013 | Nakil | ...................... H04L 43/04 709/224 |
| 2014/0115584 A1 | 4/2014 | Mudigonda et al. | |
| 2014/0129700 A1* | 5/2014 | Mehta | ................. G06F 11/3636 709/224 |
| 2014/0241173 A1 | 8/2014 | Knight | |
| 2015/0082370 A1* | 3/2015 | Jayaraman | ............... H04L 63/20 726/1 |
| 2015/0163158 A1 | 6/2015 | Ryland | |
| 2015/0188949 A1* | 7/2015 | Mahaffey | ............ H04L 41/0894 726/1 |
| 2015/0244617 A1* | 8/2015 | Nakil | ................... H04L 41/0897 709/224 |
| 2016/0057105 A1 | 2/2016 | Kato | |
| 2016/0057107 A1* | 2/2016 | Call | ....................... H04L 63/02 726/11 |
| 2016/0112497 A1 | 4/2016 | Koushik et al. | |

OTHER PUBLICATIONS

Amazon Web Service, "Amazon Elastic Compute Cloud User Guide for Linux", API Version, Jun. 15, 2014, pp. 1-685.
Wikipedia, "Virtual Private Networks," Aug. 2008, pp. 1-8.
Masahiro Satou, et al., "Server Side Networking for Cloud Data Centers", 2012 IEEE 1st International Conference on Cloud Networking (Cloudnet), Nov. 28, 2012, pp. 17-22.
Kapil Bakshi, "Considerations for Software Defined Networking (SDN): Approaches and Use Cases", Aerospace Conference, 2013 IEEE, Mar. 2, 2013, pp. 1-9.

\* cited by examiner

LINKING RESOURCE INSTANCES TO VIRTUAL NETWORK IN PROVIDER NETWORK ENVIRONMENTS

BACKGROUND

This application is a continuation of U.S. patent application Ser. No. 16/530,881, filed Aug. 2, 2019, which is a continuation of Ser. No. 15/823,185, filed Nov. 27, 2017, now U.S. Pat. No. 10,374,949, which is a divisional of U.S. patent application Ser. No. 14/542,513, filed Nov. 14, 2014, now U.S. Pat. No. 9,832,118, which are hereby incorporated by reference herein in their entirety.

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Figure 1A:
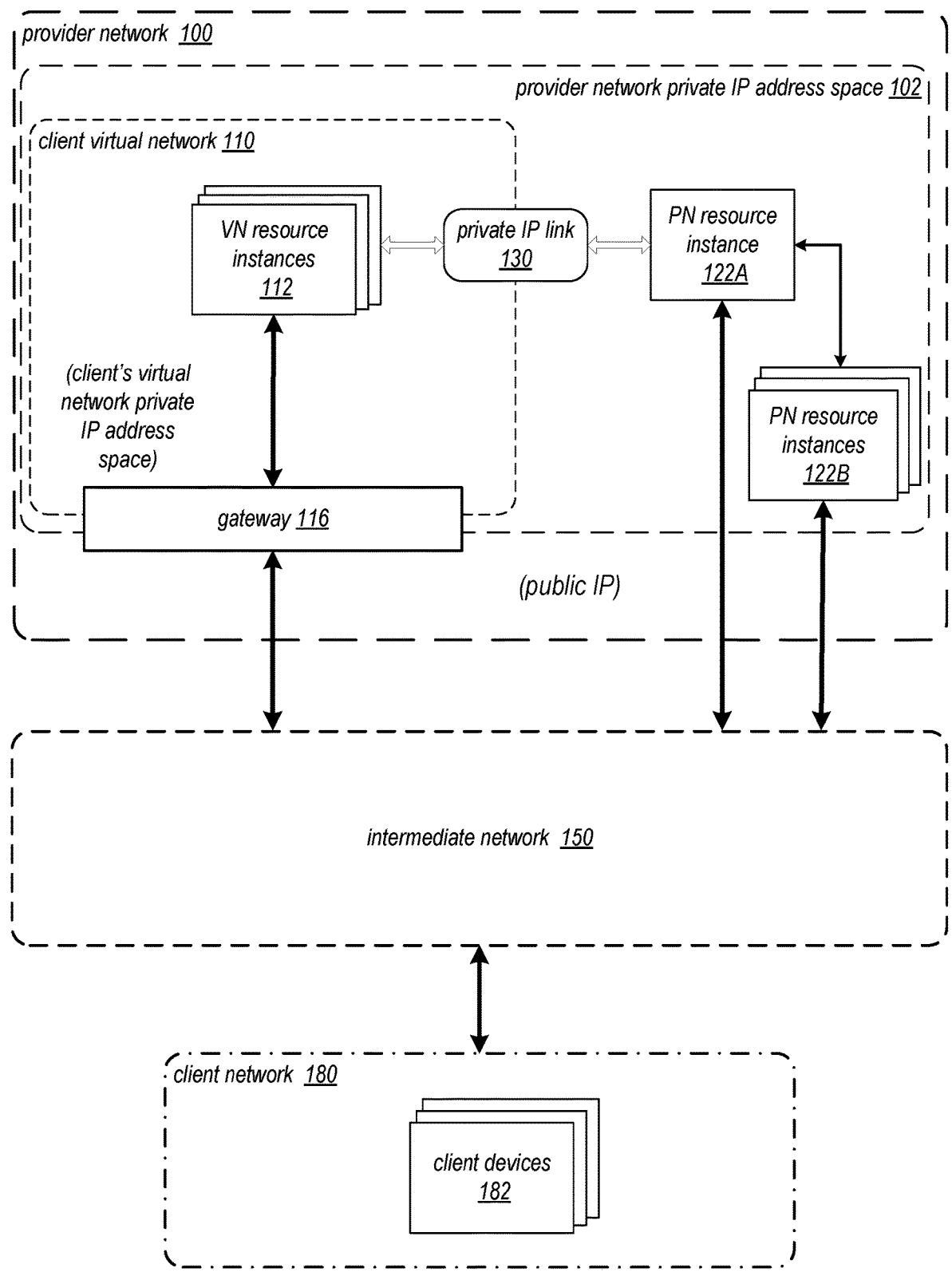
FIG. 1A illustrates establishing a private Internet Protocol (IP) link between a client virtual network and a client resource instance on a provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various embodiments of methods and apparatus for linking resource instances to virtual networks in provider network environments are described. Embodiments of methods and apparatus are described that allow clients to link their resource instances on a provider network with resources provisioned in or accessible via the clients' virtualized private networks (referred to herein as virtual networks) on the provider network. Embodiments of the methods and apparatus for linking resource instances to virtual networks in provider network environments may be implemented as or by one or more services of the provider network. For simplicity, the implementation of the methods and apparatus for linking resource instances to virtual networks may collectively be referred to herein as a private IP link service.

In some embodiments, the resource instances provisioned in a client's virtual network (referred to as virtual network (VN) resource instances) are in a client-configured private IP address space. Generally, the VN resource instances can be reached from endpoints external to the virtual network, including the client's resource instances on the provider network (referred to as provider network (PN) resource instances), only through a public IP interface of the virtual network, if one is provisioned. This provides network layer isolation for the virtual network from the rest of the provider network.

Via embodiments of the private IP link service, a client of a provider network can establish private IP communications between the client's resource instances on the provider network and the client's resource instances provisioned in the client's virtual network, or between the client's resource instances on the provider network and other endpoints accessible via the virtual network, via links from the private IP address space of the virtual network to the private IP address space of the provider network. The PN resource instances remain part of the client's provider network implementation and may thus also communicate with other resource instances on the provider network and/or with entities on external networks via the provider network and public IP while communicating with VN resource instances via private IP.

Since embodiments of the private IP link service may be leveraged to establish links from a private IP address space of a virtual network to the private IP address space of the provider network, at least some embodiments may require that the virtual network private IP address space does not overlap the provider network private IP address space before enabling private IP linking for the virtual network to avoid address conflicts and collisions.

In some embodiments, a client may leverage the private IP linking functionality provided via the private IP link service to incrementally migrate functionality from their PN resource instances to their virtual network and VN resource instances, while maintaining private IP communications between the PN and VN resource instances via private IP links. Using public IP to access VN resource instances from PN resource instances may generally require gradual migrations to virtual network implementations using public IP data transfer, and may thus require complex access control management. In some embodiments, using the private IP link service, VP resource instances can be linked to a virtual network and added to virtual network access groups. The communication between the PN resource instances and VN resource instances may be over private IP via private IP link(s), and may be managed in a similar manner and with similar ease as communication between any two VN resources instances in the virtual network is managed, thus simplifying the migration process.

In some embodiments of a provider network, some features and resource types may be available to clients only within a virtual network environment. For example, in some embodiments, the provider network may provide enhanced networking features, enhanced computation resource instances, and egress filtering only within a client's virtual network implementation. In some embodiments, the private IP linking functionality provided via the private IP link service may allow clients to begin using at least some of these virtual network-only features and resources before they completely migrate their provider network implementation into the virtual network platform.

Figure 13:
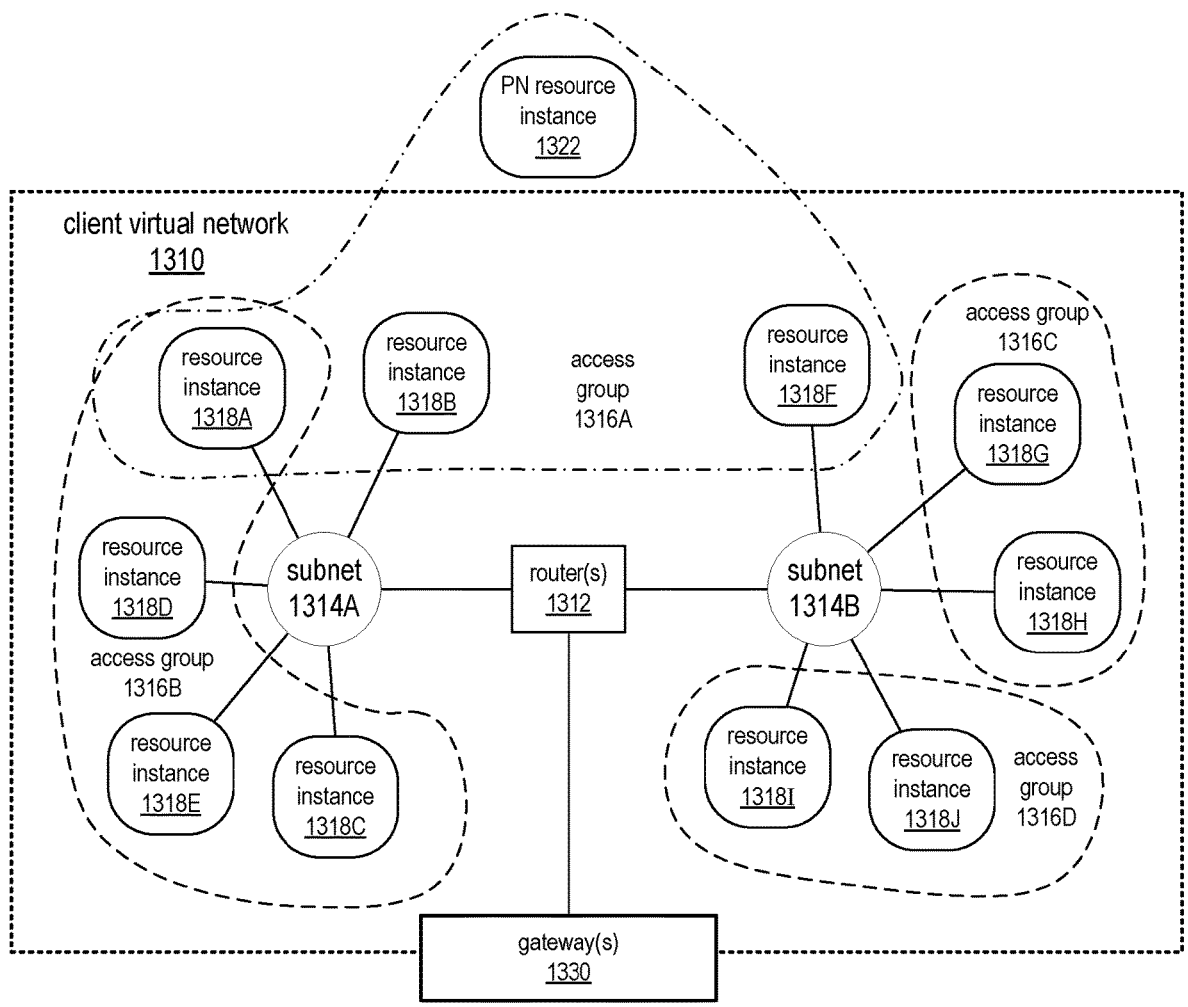
FIG. 13 illustrates subnets and access groups in an example virtual network implementation on a provider network, according to at least some embodiments.

In some embodiments, a provider network may allow clients to establish virtual access groups within a virtual network, for example as illustrated in FIG. 13. In some embodiments, the private IP linking functionality provided via the private IP link service may allow virtual network access groups to include PN resource instances as members as well as VN resource instances, making it possible for the client to manage access to both PN resource instances and VN resource instances using the same set of virtual network access groups and access group rules. For example, as shown in FIG. 13, PN resource instance 1322 has been added to access group 1316A, so resource instance 1322 can communicate with resource instances 1318A and 1318B on subnet 1314B and resource instance 1318F on subnet 1314B.

In some embodiments, the private IP linking functionality provided via the private IP link service may allow the client early access to at least some virtual network features from the client's PN resource instances in the client's provider network implementation, and may also help enable a gradual transition from the client's provider network implementation into the virtual network environment. The client may over time transfer functionality from the client's provider network implementation into a client virtual network and into virtual network access groups, possibly eventually terminating all of their non-VN-based PN resource instances and provider network implementation.

While the above describes leveraging the private IP linking functionality in migrating a client's provider network implementation into a virtual network environment on the provider network as an example use case, note that clients may use the private IP linking functionality for various other purposes on the provider network. For example, a client may maintain a server (e.g., an application or web server) on the provider network as a PN resource instance with a public IP address, while maintaining a virtual network with no public IP interface on the provider network. The private IP link service may be used to establish a private IP link from the virtual network to the server PN resource instance so that the client's server can access resource(s) on the virtual network via private IP.

In some embodiments, a virtual network may by default be created with private IP linking disabled. To link a PN resource instance to the virtual network, the client first enables resource linking for the virtual network, and then links the PN resource instance to the link-enabled virtual network. However, in some embodiments, virtual networks may instead or also be launched with private IP linking enabled. In some embodiments, instead of requiring a client to first enable private IP linking for a virtual network before linking a PN resource instance to the virtual network, private IP linking may be automatically enabled for the virtual network when linking a PN resource instance to a virtual network if not already enabled.

In some embodiments of a provider network, a client may leverage one or more services of the provider network to automatically provision or "spin up" new client resource instances on the provider network or within a virtual network on the provider network, for example when demand increases, and to terminate or "spin down" client resource instances, for example when demand decreases. The one or more services may allow the client to specify configurations of the client resource instances to be automatically provisioned via APIs to the services. In some embodiments, the APIs may allow the client to specify that a new client resource instance on the provider network is to be automatically linked to a specified virtual network, and to specify private IP link details such as access group(s) to which the client resource instance is to be added. In some embodiments, new virtual network implementations may also be automatically provisioned, and the one or more services may allow the client to specify whether the new virtual network implementations are to be instantiated with private IP linking enabled or disabled.

Embodiments of the methods and apparatus for linking resource instances to virtual networks in provider network environments may, for example, be implemented in the context of a service provider that provides to clients, via an intermediate network such as the Internet, virtualized resources (e.g., virtualized computing and storage resources) implemented on a provider network of a service provider, and that allow the clients to establish virtual networks within the provider network (referred to herein as virtual networks) in which the client may launch virtualized resources. FIGS. 9 through 13 and the section titled Example provider network environments further illustrate and describe example service provider network environments in which embodiments of the methods and apparatus as described herein may be implemented.

FIG. 1A illustrates establishing a private Internet Protocol (IP) link between a client virtual network and a client resource instance in a provider network environment, according to at least some embodiments. FIG. 1A shows as an example a provider network 100 environment in which entities on client network(s) 180 and other external entities may access resources on a provider network 100 over an intermediate network 150 such as the Internet. In FIG. 1A, a client corresponding to client network 180 has provisioned resource instances 122A and 122B on the provider network 100. The client has also established a virtual network 110 on the provider network 100. A virtual network 110 in a provider network 100 environment may be broadly defined as a network space (e.g., logically defined by an address range) that contains a set of provider network 100 resources of a respective client, and that acts as a logically isolated section on the provider network 100 for the client's resources. For example, in FIG. 1A, virtual network 110 contains resource instances 112 (e.g., virtual machines including guest operating systems). In some embodiments, the resource instances 112 are assigned private IP addresses in a client-configured private IP address space of the virtual network. A virtual network 110 may include or implement security and access control for the virtual network 110 and for the resources 112 within the virtual network 110. For example, in FIG. 1A, virtual network 110 includes a gateway 116 that controls access to resources 112 from client network 180, from other entities on provider network 100 such as resource instances 122, and from other entities external to provider network 100. As another example, virtual network 110 may implement route tables, network access control lists (ACLs), and in some embodiments virtual access groups to control access to resource instances 112.

In at least some embodiments of a provider network 100, at least some of the resources (e.g., resource instances 112 and 122) provided to clients of a service provider via the provider network 100 may be virtualized computing resources implemented on multi-tenant hardware that is shared with other client(s) and/or on hardware dedicated to the particular client. Each virtualized computing resource may be referred to as a resource instance. Resource instances may, for example, be rented or leased to clients of the service provider. For example, clients of the service provider (represented in FIG. 1A by client network(s) 180), via external client device(s) coupled to the provider network 100 via an intermediate network 150 such as the Internet, may access one or more services of the provider network via application programming interfaces (APIs) to the services to obtain and configure resource instances, including but not limited to computation resources and storage resources.

At least some of the resource instances on the provider network 100 may be implemented according to hardware virtualization technology that enables multiple operating systems to run concurrently on a host computer, i.e. as virtual machines (VMs) on the host. A hypervisor, or virtual machine monitor (VMM), on a host presents the VMs on the host with a virtual platform and monitors the execution of the VMs. Each VM may be provided with one or more provider network private IP addresses; the VMM on a respective host may be aware of the private IP addresses of the VMs on the host. For further information about hardware virtualization technology on a provider network, see FIG. 10.

Referring to FIG. 1A, the provider network 100 may include a network substrate that includes networking devices such as routers, switches, network address translators (NATs), and so on, as well as the physical connections among the devices. In at least some embodiments, the VMMs or other devices or processes on the network substrate may use encapsulation protocol technology to encapsulate and route network packets (e.g., client IP packets) over the network substrate between resource instances on different hosts within the provider network 100. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. In at least some embodiments, the encapsulation protocol technology may include a mapping service that maintains a mapping directory that maps IP overlay addresses (public IP addresses) to substrate IP addresses (private IP addresses) and that may be accessed by various processes on the provider network 100 for routing packets between endpoints on the network substrate. For further information about a virtual network technology that uses an encapsulation protocol to implement an overlay network on a network substrate, see FIGS. 9 through 13.

Figure 8:
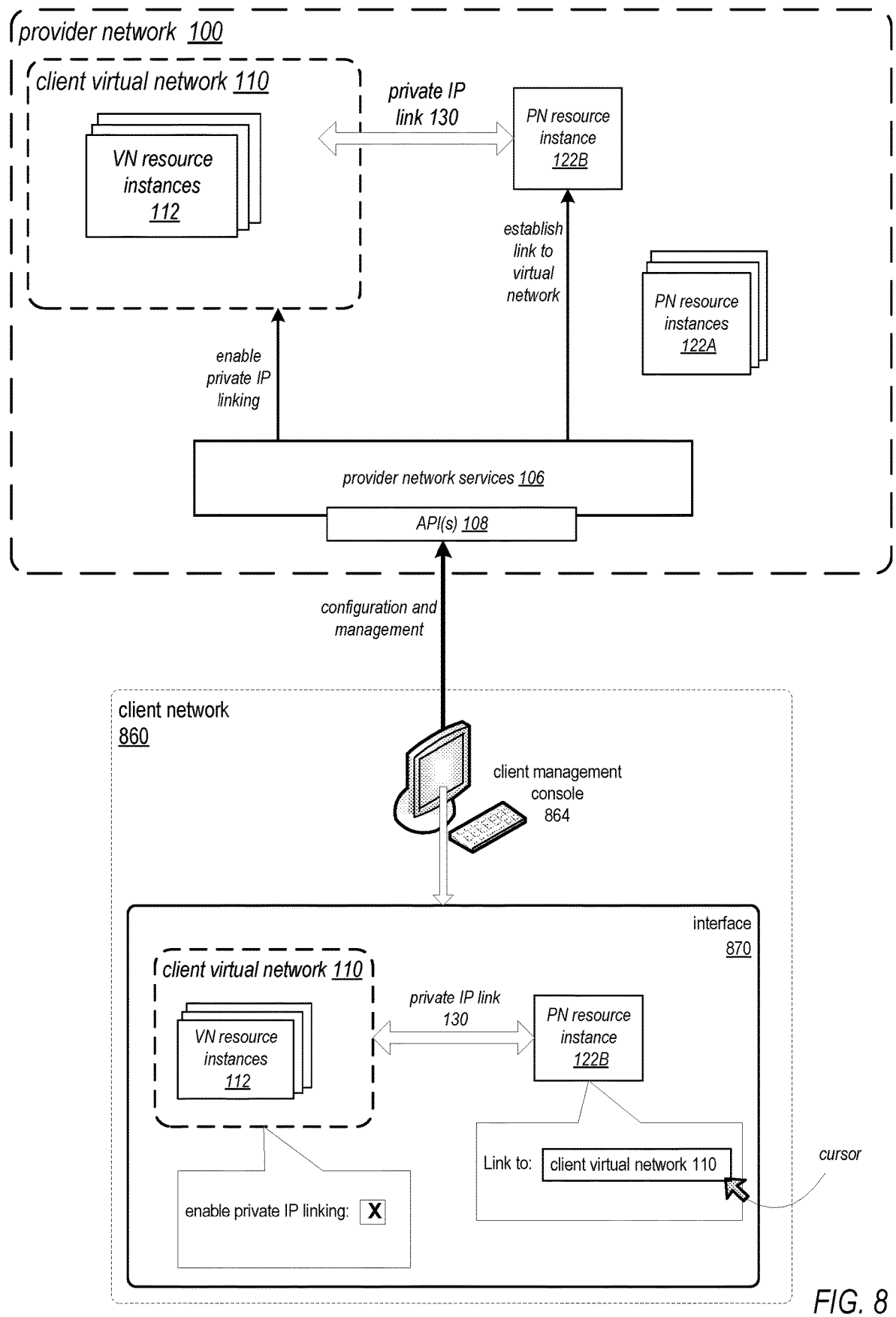
FIG. 8 illustrates services and APIs in a provider network environment, according to at least some embodiments.
Figure 12:
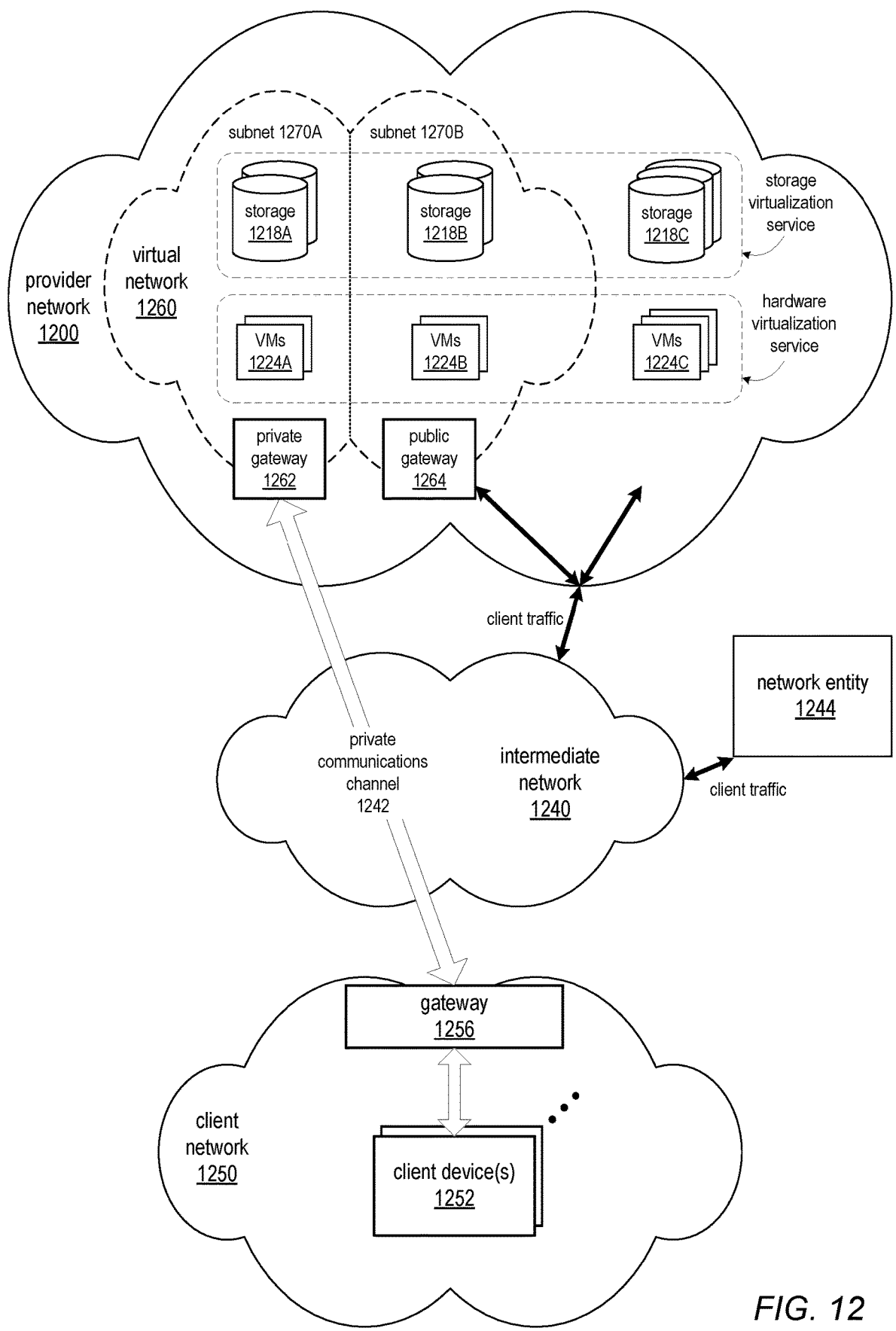
FIG. 12 illustrates an example provider network that provides virtual networks to at least some clients, according to at least some embodiments.

In some embodiments, as shown in FIG. 8, a service provider may provide services and application programming interfaces (APIs) to the services that, for example, allow clients to provision logically isolated sections of the provider network 100 in which the clients can launch their respective resource instances in a client-defined virtual network on the provider network 100, referred to herein as a virtualized virtual network or client virtual network, or as simply a virtual network. Via the APIs, a client (represented in FIG. 1A by client network(s) 180) may establish, configure, and manage a client virtual network 110 on provider network. The client may also establish and manage client virtual network security and access control for the virtual networking environment of the client virtual network 110 via the API(s) to the virtual network service(s). For example, the client may perform one or more of selecting private IP address ranges, creating subnets and network access control lists (ACLs), creating and managing access groups, and configuring route tables, network gateways, load balancers, routers, and other network functionalities to configure the client virtual network 110 and to control access to the client virtual network 110 and its resources 112. Via the API(s), a client may customize the network configuration of their client virtual network 110. For example, as illustrated in FIG. 12, a client can create a public-facing subnet for web server resources that has access to the Internet, and may place backend system resources such as databases or application servers in a private-facing subnet with no public Internet access. A client may leverage multiple layers of security and access control, including but not limited to access groups and network ACLs, to control access to subnets and/or to resource instances in each subnet, for example as illustrated in FIG. 13.

In some embodiments, a given client may establish one, two, or more separate virtual networks 110 on a provider network 100, and different clients may each establish virtual networks 110 on a provider network 100. In some embodiments, a client may specify a private IP address space for each client virtual network 110 on the provider network 100. In some embodiments, the private IP address spaces of two (or more) client virtual networks 110 may, but do not necessarily, overlap.

Figure 9:
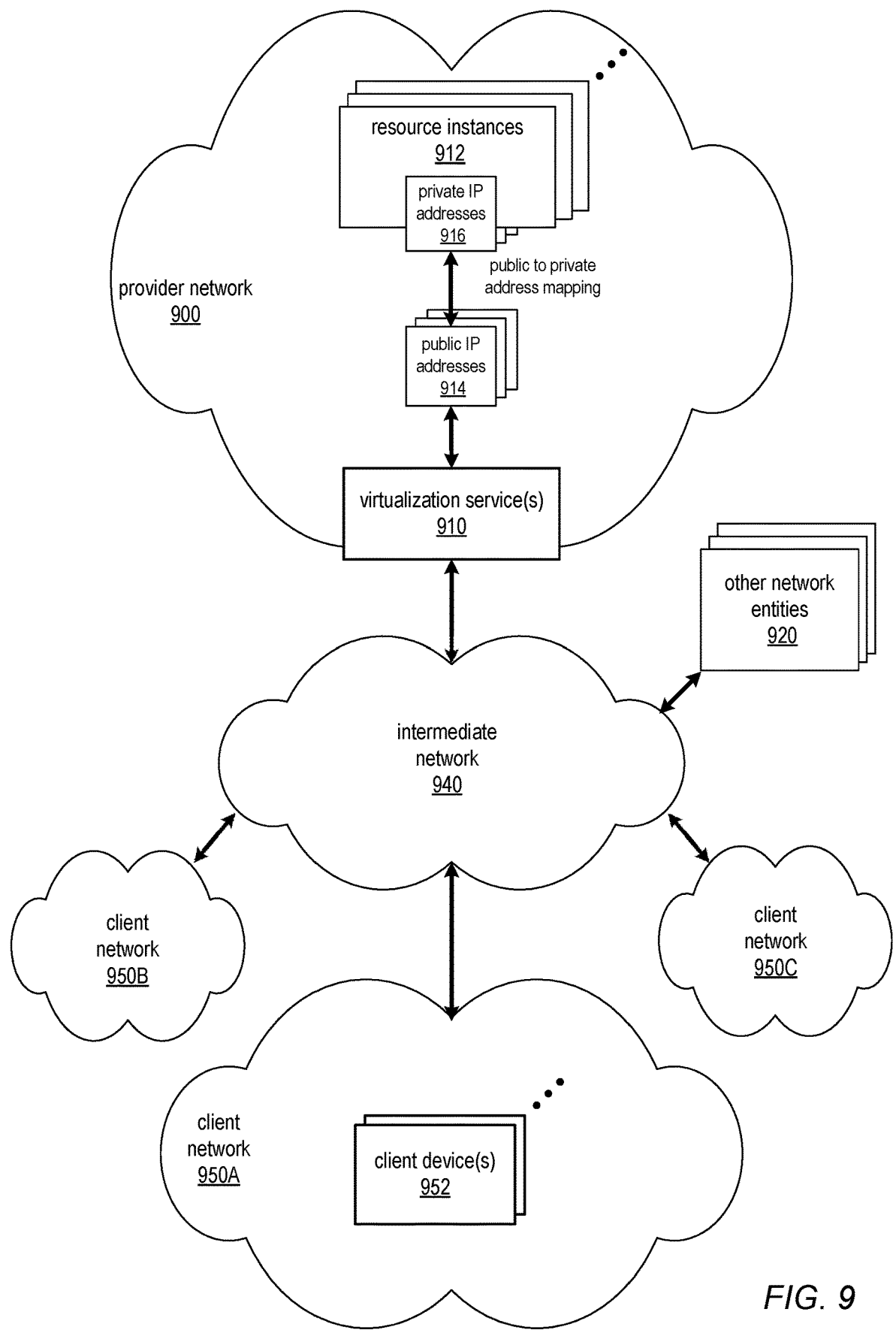
FIG. 9 illustrates an example provider network environment, according to at least some embodiments.
Figure 11:
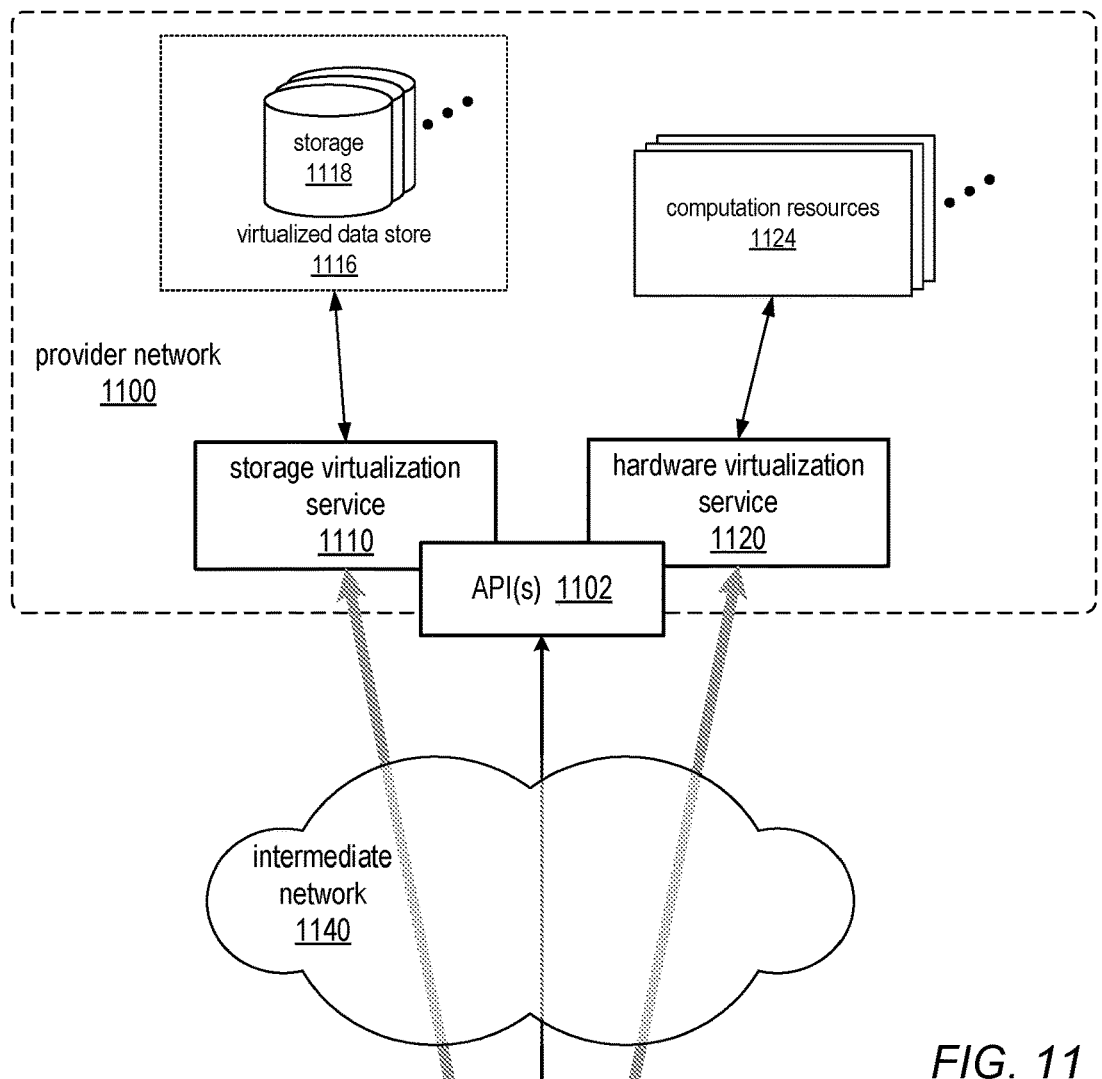
FIG. 11 is a block diagram of an example provider network that provides a storage virtualization service and a hardware virtualization service to clients, according to at least some embodiments.
Figure 11:
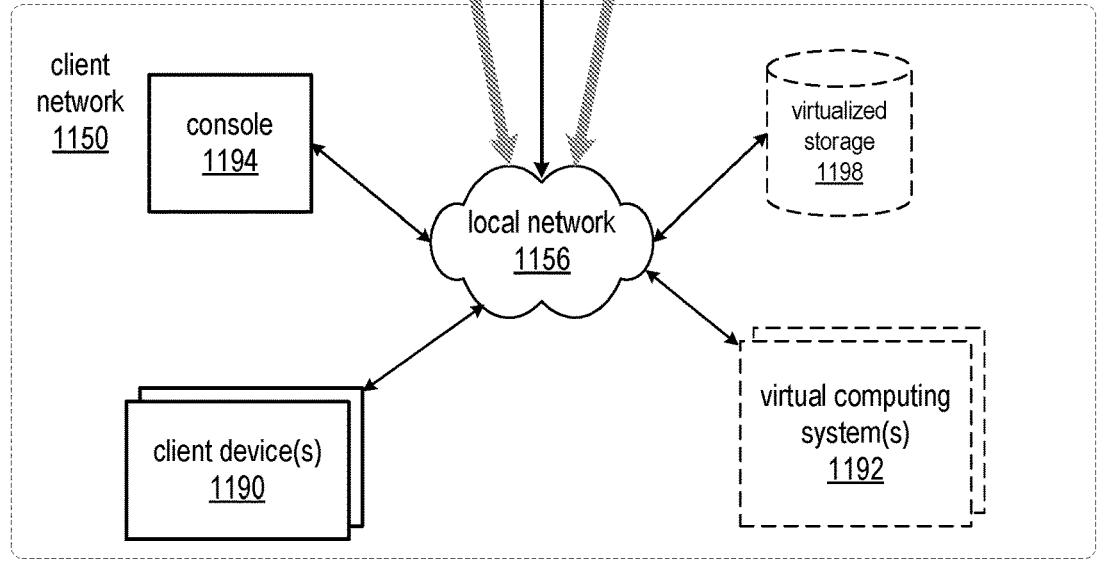

Referring to FIG. 1A, a client of a provider network 100 (e.g., a client associated with client network 180) may provision one or more resource instances 122 on the provider network 100, for example via one or more virtualization services as illustrated in FIG. 9 and FIG. 11. These resource instances 122 may be referred to as provider network (PN) resource instances. Private IP addresses within the provider network private IP address space 102 may be associated with the client's PN resource instances 122; these private IP addresses are the internal network addresses of the resource instances on the network substrate of the provider network. The provider network 100 may also provide public IP addresses and/or public IP address ranges (e.g., Internet Protocol version 4 (IPv4) or Internet Protocol version 6 (IPv6) addresses) that are assigned to, or that clients can associate with, PN resource instances 122; the provider network 100 maps the public IP addresses of the client's resource instances to the provider network's private IP addresses.

The client may also establish a virtual network 110 on the provider network 100, and may provision resource instances 112 within the virtual network 110 using one or more services of the provider network, for example as illustrated in FIGS. 12 and 13. These resource instances may be referred to as virtual network (VN) resource instances 112. In some embodiments, the client may select a private IP address space for the client's virtual network 110; this private IP address space may be any valid private IP address range that the client chooses to use, and is independent of the provider network private IP address space 102 and thus independent of the provider network private IP addresses associated with the client's resource instances on the provider network 100. The provider network 100 may also allow the client to provision a public gateway 116 for the virtual network 110 with a public IP address via which entities external to the virtual network 110, including the client's VN resource instances 122, may access at least some of the client's VN resources 112 on the virtual network 110.

Embodiments of a private IP link service may allow a client to establish a virtual private IP link 130 between the client's PN resource instances 122 on the provider network 100 and the client's virtual network 110 on the provider network 100, and thus allow the client's PN resource instances 122 to access the client's VN resource instances 112 via the client's virtual network 110 through private IP addressing. By establishing a virtual private IP link 130 between a PN resource instance 122A and a virtual network 110 as shown in FIG. 1A, the PN resource instance 122A may access VN resource instances 112 or other endpoints reachable via the virtual network 110 via private IP addressing without having to go through the gateway 116 via the virtual network 110's public IP address. In addition, a virtual private IP link 130 may be established from a PN resource instance 122A to a virtual network 110 or virtual network 110 subnetwork that does not provide a public IP interface, thus allowing a PN resource instance 122A access to resource instances 112 of a virtual network 110 that are not accessible via a public IP address.

Via a virtual private IP link 130, a client's PN resource instance 122A on the provider network 100 may communicate with the client's VN resource instances 112 within the client's virtual network 110 through private IP addressing, and may also communicate with other endpoints that are reachable via the virtual network 110. However, the PN resource instance 122A remains part of the client's provider network implementation including other PN resource instances 122B and still has a public IP address on provider network 100, so the PN resource instance 122A may also communicate with other PN resource instances 122B via provider network 100 and with other entities via intermediate network 150. Thus, embodiments of a private IP link service may allow a client's PN resource instances 122 to communicate with endpoints in multiple network environments.

In some embodiments, a client may implement and manage access groups within a virtual network 110, for example as illustrated in FIG. 13. In some embodiments, a virtual network access group may act as a virtual firewall that controls the traffic allowed to reach one or more resource instances 112 within the access group. The client may establish one or more access groups within the virtual network 110, and may associate each resource instance 112 in the virtual network 110 with one or more of the access groups. In some embodiments, the client may establish and/or modify rules for each access group that control the inbound traffic that is allowed to reach the resource instances associated with the access group. In some embodiments, a client may be allowed to associate a client's linked PN resource instance 122A with the virtual network 110's access groups, thus allowing the client's linked PN resource instance 122A and the client's VN resource instances 112 to be members of the same virtual network 110 access groups.

In some embodiments, a private IP link 130 established via the private IP link service may allow the client's linked PN resource instance 122A to access various provider network services in or via the client's virtual network 110, including but not limited to database services, load balancer services, data warehousing services, and caching services, through private IP addressing.

In some embodiments, to establish a private IP link 130 between a client's PN resource instances 122 on the provider network 100 and the client's virtual network 110 on the provider network 100, a client may first enable private IP linking for the virtual network 110, for example via one or more application programming interfaces (APIs) to one or more provider network services as illustrated in FIG. 8. In some embodiments, in response to enabling private IP linking for the virtual network 110, a route is added to the route tables of each subnet in the virtual network 110 specifying the provider network 100 private IP address space so that traffic originating from VN resource instances 112 in the virtual network 110 that are targeted at a PN private IP address are not routed out of the virtual network 110, but are instead routed to PN resource instance(s) that are linked into the virtual network 110. For example, if the provider network 100 private IP address space is 10.0.0.0/8, the route may be specified as "10.0.0.0/8==>Local". Given a virtual network 110 private IP address space of 172.16.0.0/16, an example route table for subnet(s) of the virtual network 110 once private IP linking is enabled for the virtual network 110 may include:

172.16.0.0/16=>Local (existing route from creation of the virtual network 110)
0.0.0.0/0=>IGW (existing route for Internet-bound traffic via a gateway 114)
10.0.0.0/8=>Local (new route added when private IP linking is enabled)
<other route(s)> (route(s) to other IP addresses spaces reachable via the virtual network)

In some embodiments, once private IP linking has been enabled for the virtual network 110, the client may establish a private IP link from a PN resource instance 122A to the virtual network 110, for example via one or more APIs to one or more provider network services as illustrated in FIG. 8. In some embodiments, the client may select the PN resource instance 122A to be linked, and then select a link-enabled virtual network 110 to which the PN resource instance 122A is to be linked. In some embodiments, a link-enabled virtual network 110 may include one or more access groups, for example as illustrated in FIG. 13, and the client may select an access group within the virtual network 110 to join the selected PN resource instance 122A to the selected access group. For example, as shown in FIG. 13, PN resource instance 1322 has been added to access group 1316A, so PN resource instance 1322 can communicate with resource instances 1318A and 1318B on subnet 1314B and resource instance 1318F on subnet 1314B.

Figure 1B:
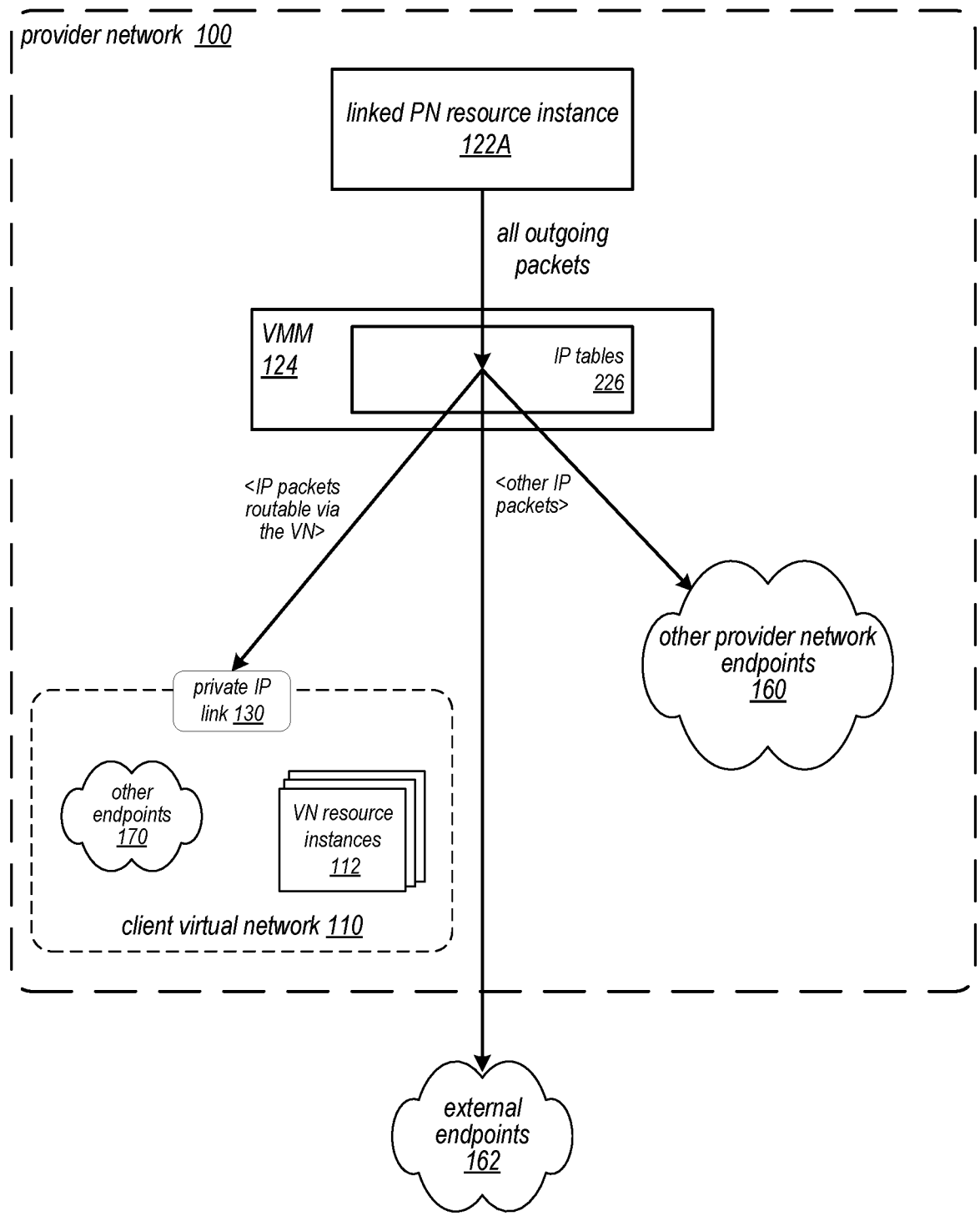
FIG. 1B illustrates a provider network (PN) resource instance communicating with endpoints via a virtual network through a private IP link while also communicating with other endpoints, according to at least some embodiments.

FIG. 1B illustrates a PN resource instance 122 communicating with endpoints via a virtual network 110 through a private IP link 130 while also communicating with other endpoints in other networks, according to some embodiments of a private IP link service. Via an embodiment of the private IP link service, a client of the provider network 100 can establish private IP communications between the client's resource instance 122A on the provider network 100 and the client's resource instances 112 provisioned in the client's virtual network 110 or other endpoints 170 accessible via the virtual network 110 via a private IP link 130 from the private IP address space of the virtual network 110 to the private IP address space of the provider network 100. The PN resource instance 122A remains part of the client's provider network 100 implementation and still has a public IP address on provider network 100, and thus may also communicate with other endpoints 160 via the provider network 100 and with endpoints 162 on external networks via public IP while communicating with VN resource instances 112 and other endpoints 170 via virtual network 110. Thus, embodiments of a private IP link service may allow a client's PN resource instances 122 to communicate with endpoints in multiple network environments from a single private IP address.

Figure 2:
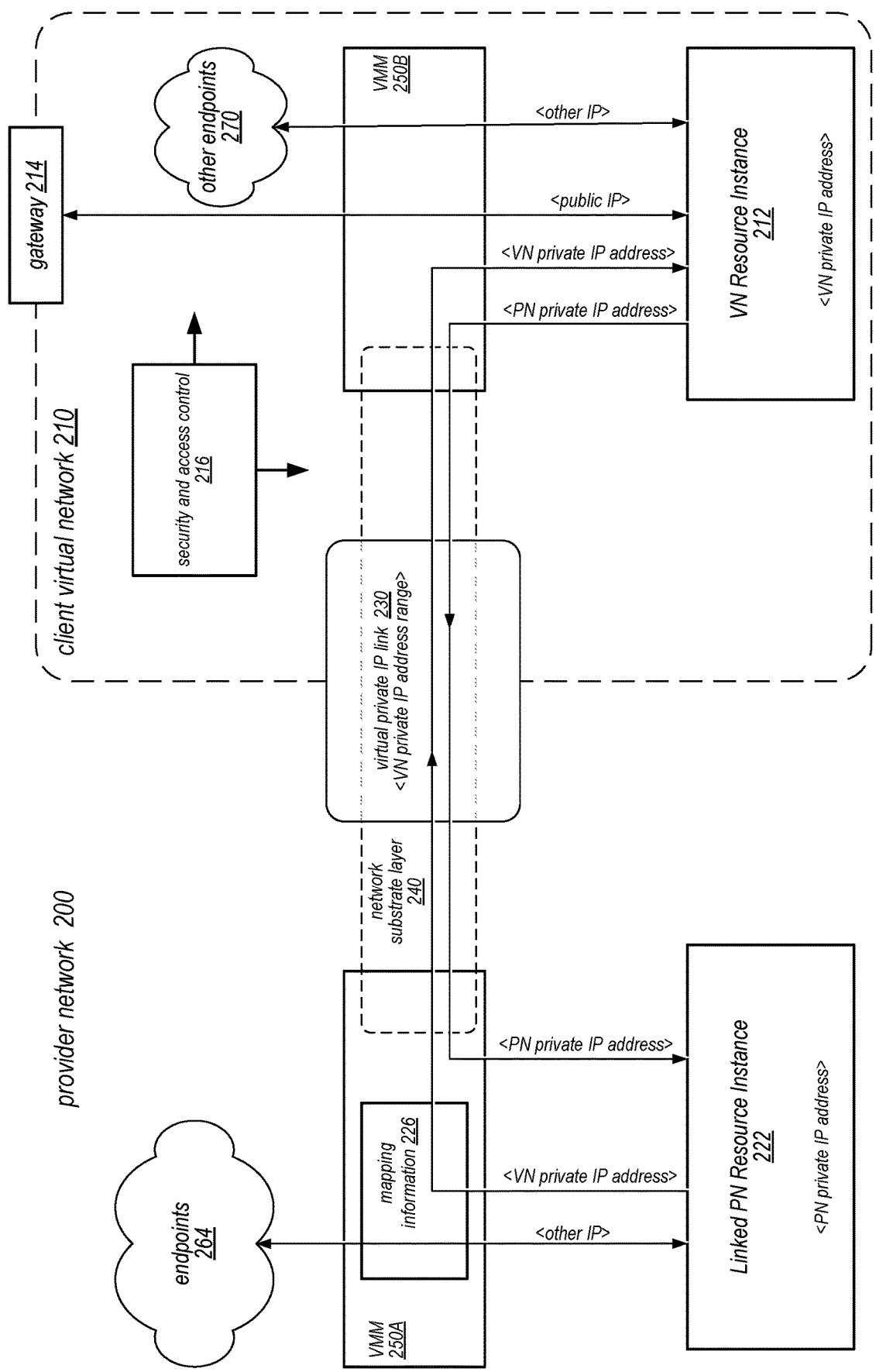
FIG. 2 illustrates a private IP link from a provider network resource instance to a virtual network resource instance in a provider network environment, according to at least some embodiments.

FIG. 2 illustrates a private IP link from a provider network resource instance to a virtual network resource instance in a provider network environment, according to at least some embodiments. A client of a provider network 200 may provision a resource instance 222 on the provider network 200, for example via one or more virtualization services as illustrated in FIG. 9 and FIG. 11. The PN resource instance 222 may be assigned a private IP address within the private IP address space of the provider network 200 substrate.

In FIG. 2, the client has established a virtual network 210 on the provider network 200. Virtual network 210 may include a public gateway 216 that exposes a public IP address for the virtual network 210, or for a subnet of the virtual network 210, via which entities external to the virtual network 210, including but not limited to the client's other resource instances 222 on provider network 200, may access at least some of the client's resources provisioned within the virtual network 210. Note, however, that a virtual network 210 may be implemented that does not expose a public IP address, or that includes at least one subnet that does not expose a public IP address. For example, as illustrated in FIG. 12, a client can create a public-facing subnet for resources that has access to the Internet, and may place backend system resources such as databases or application servers in a private subnet with no public Internet access. The virtual network 210 may include or implement security and access control 216 for the resources within the virtual network 210. For example, virtual network 210 may implement route tables, network access control lists (ACLs), and in some embodiments virtual access groups to control access to resource instances 212.

The client may provision a resource instance 212 within the virtual network 210, for example using one or more services of the provider network as illustrated in FIGS. 12 and 13. In some embodiments, the client may select a private IP address space for the client's virtual network 210, and a private IP address within the virtual network's private IP address space may be assigned to resource instance 212. Resource instance 212 may be included in security and access control 216 for virtual network 210, for example in a network ACL for a subnet on which resource instance 212 resides. In some embodiments, resource instance 212 may be added as a member to one or more virtual access groups of virtual network 210. FIG. 13 illustrates subnets and access groups in an example virtual network implementation on a provider network, according to at least some embodiments.

In some embodiments, resource instances 212 and 222 may be implemented on provider network 200 according to hardware virtualization technology that enables multiple operating systems to run concurrently on a host computer, i.e. as virtual machines (VMs) on the host. A hypervisor, or virtual machine monitor (VMM) 250, on a host presents the VMs on the host with a virtual platform and monitors the execution of the VMs. For further information about hardware virtualization technology on a provider network, see FIG. 10. The provider network 200 may include a network substrate 240 layer that includes networking devices such as routers, switches, network address translators (NATs), and so on, as well as the physical connections among the devices. In at least some embodiments, the VMMs 250 or other devices or processes on the network substrate 240 layer may use encapsulation protocol technology to encapsulate and route network packets (e.g., client IP packets) over the network substrate 240 between resource instances on different hosts within the provider network 200, or between resource instances and other endpoints on the provider network 200.

In some embodiments, a VMM 250 (e.g., VMM 250A) may include or may access mapping information 226 that may specify rules for mapping public IP packets originating from the resource instances on the respective host device to target or destination endpoints 264 via the provider network 200, and for mapping IP packets from other endpoints 264 to the resource instances on the respective host. The endpoints 264 may include resource instances on the same host device or on other host devices within the provider network 200, and may also include public IP endpoints external to the provider network 200.

Figure 3:
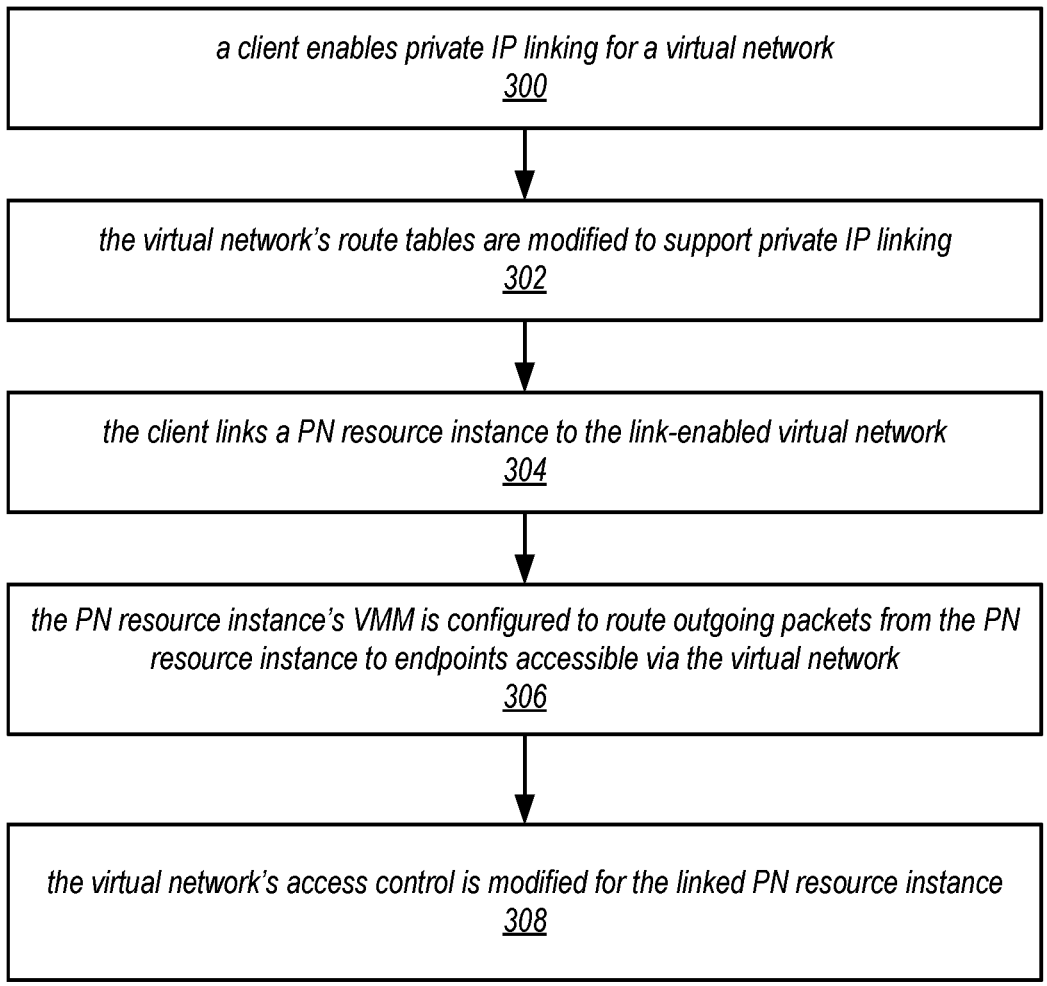
FIG. 3 is a high-level flowchart of a method for establishing a private IP link from a provider network resource instance to a virtual network, according to at least some embodiments.

In some embodiments, the client may establish a virtual private IP link 230 between the client's PN resource instances 222 on the provider network 200 and the client's virtual network 210. In some embodiments, to establish the link 230, the client may first enable private IP linking for the virtual network 210, and then link the PN resource instance 222 to the virtual network 210, for example as illustrated in FIG. 8. FIG. 3 is a high-level flowchart of a method for establishing a private IP link from a provider network resource instance to a virtual network, according to at least some embodiments.

As indicated at 300 of FIG. 3, a client enables private IP linking for a virtual network. In some embodiments, the private IP address space of the virtual network may be checked to determine that the virtual network private IP address space does not overlap the provider network private IP address space before enabling private IP linking for the virtual network to avoid address conflicts and collisions.

As indicated at 302 of FIG. 3, in response to enabling private IP linking for the virtual network, the virtual network's route tables may be modified to support private IP linking functionality. In some embodiments, to enable private IP linking for the virtual network 210, a route is added to the route tables of each subnet in the virtual network 210 specifying the provider network 200 private IP address space so that traffic in the virtual network 210 can be routed to linked PN resource instances 222.

As indicated at 304 of FIG. 3, the client may link a PN resource instance to the link-enabled virtual network. As indicated at 306 of FIG. 3, in response to linking the PN resource instance to the virtual network, the PN resource instance's VMM may be configured to route at least some outgoing packets from the PN resource instance to endpoints accessible via the virtual network, including endpoints in the virtual network's private IP address space and other endpoints accessible via one or more routes in the virtual network's routing information (e.g., route tables). In some embodiments, linking a PN resource instance 222 to the virtual network 210 may involve modifying mapping information 226 of the hypervisor or VMM 250A on the host that implements the linked PN resource instance 222 to map IP packets from linked PN resource instance 222 that specify IP addresses within the virtual network's private IP address space or IP addresses of other endpoints reachable via the virtual network 210 onto the virtual network 210 for routing via the virtual network 210 to respective endpoints. In some embodiments, the mapping information 226 may be modified to include routing information for the virtual network 210, for example one or more route tables of the virtual network 210. The virtual network routing information may specify the private IP address space of the virtual network 210, for example as a route in a route table. In some embodiments, the virtual network routing information may also specify one or more other IP addresses or IP address ranges or spaces that are accessible via the virtual network 210, for example as additional route(s) in a route table. Note that VMM 250A still maps other IP traffic to and from endpoints 264 according to the modified mapping information 226 for routing via the provider network 200 to respective endpoints.

As indicated at 308 of FIG. 3, in response to linking the PN resource instance to the virtual network, the virtual network's security and access control rules may be modified for the linked PN resource instance. For example, in some embodiments, to link the PN resource instance 222 to the virtual network 210, the client may add the linked PN resource instance 222 to one or more virtual access groups of the virtual network, for example as shown in FIG. 13. As another example, in some embodiments, one or more network ACLs of the virtual network 210 may be modified to allow or restrict access to VN resource instances 212 from the linked PN resource instance 222.

Figure 4:
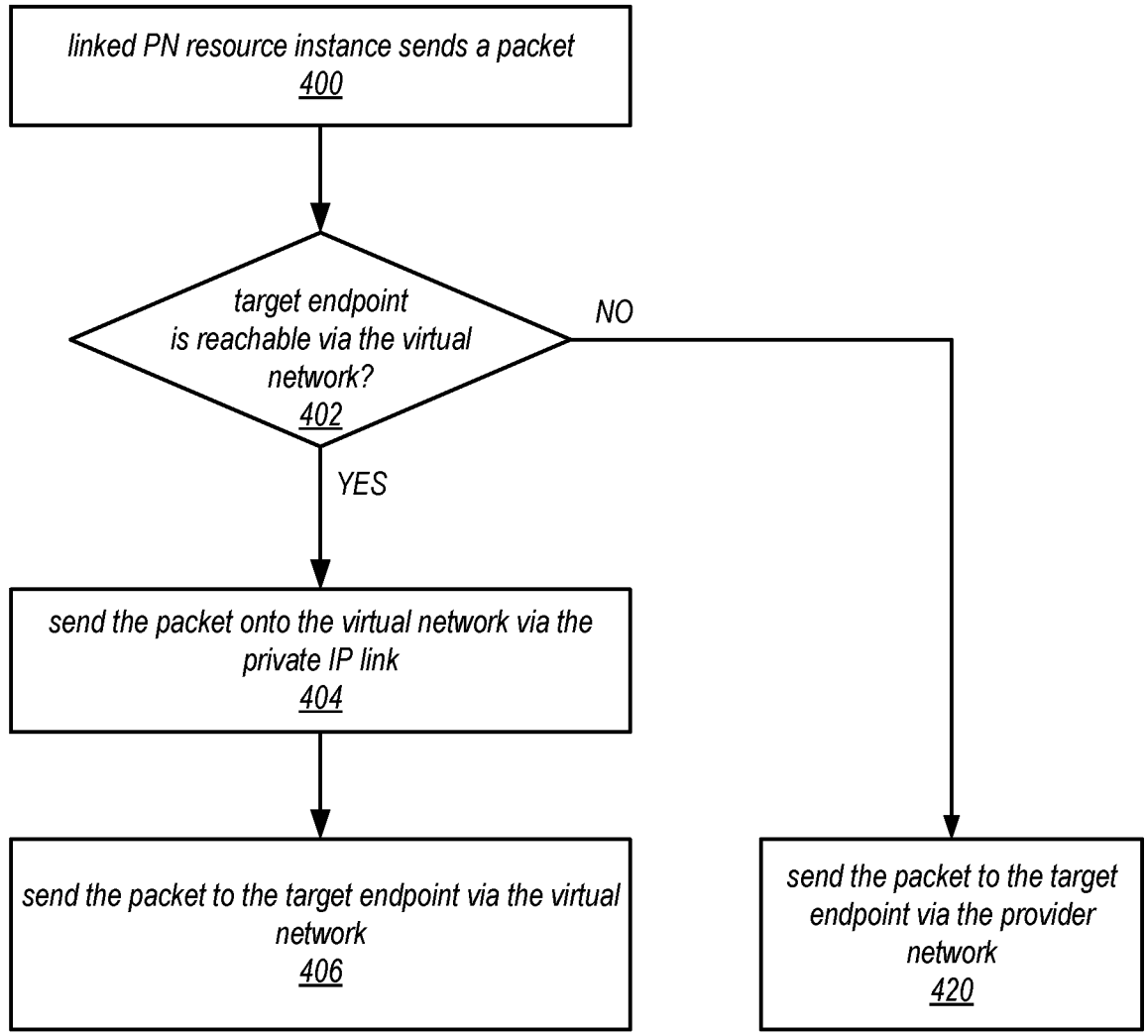
FIG. 4 is a high-level flowchart of a method for sending packets from a PN resource instance to endpoints via a virtual network through a private IP link, according to at least some embodiments.
Figure 5:
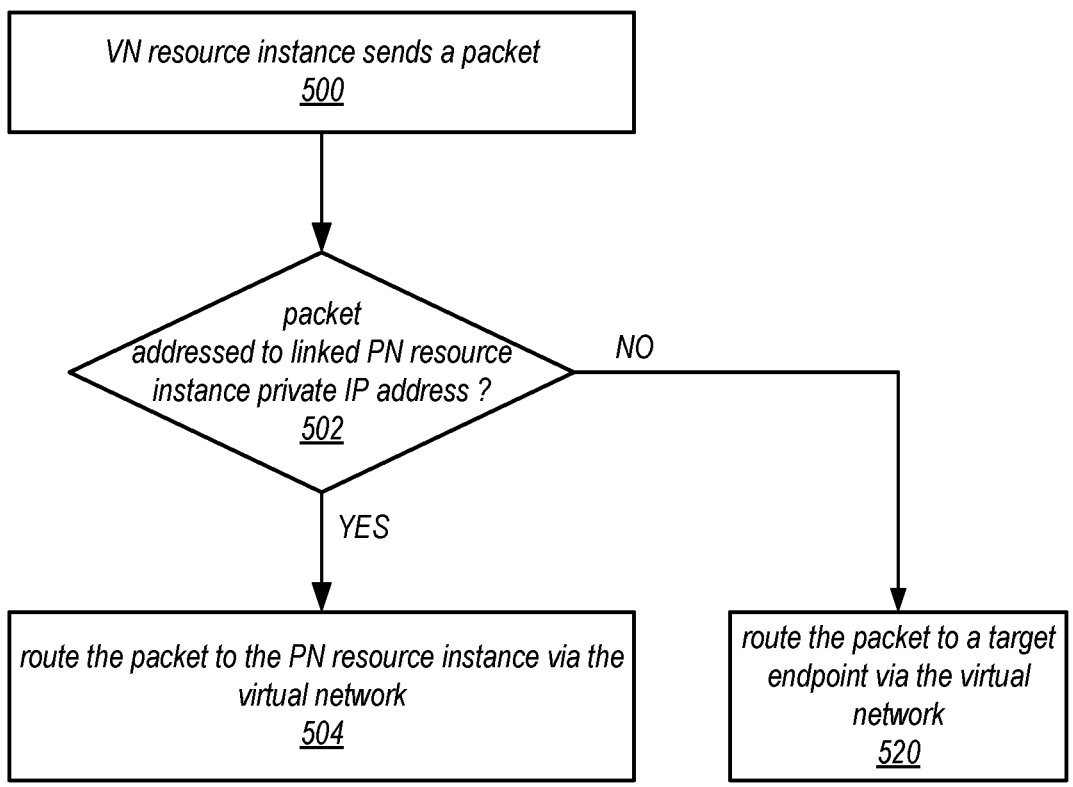
FIG. 5 is a high-level flowchart of a method for sending packets from a virtual network to a PN resource instance through a private IP link, according to at least some embodiments.

Once PN resource instance 222 is linked to virtual network 210, the linked PN resource instance 222 may communicate with one or more resource instances 212 on virtual network 210 or with other endpoints reachable via the virtual network 210 via private IP through the virtual private IP link 230 and according to security and access control 216 of the virtual network 210. FIG. 4 is a high-level flowchart of a method for sending packets from a PN resource instance to endpoints via a virtual network through a private IP link, according to at least some embodiments. FIG. 5 is a high-level flowchart of a method for sending packets from a virtual network to a PN resource instance through a private IP link, according to at least some embodiments.

FIG. 4 is a high-level flowchart of a method for sending packets from a PN resource instance to endpoints via a virtual network through a private IP link, according to at least some embodiments. As indicated at 400 of FIG. 4, a linked PN resource instance 222 generates and sends an IP packet. At 402 of FIG. 4, if the target endpoint of the packet is reachable via the virtual network, then the packet is sent onto the virtual network 210 via the private IP link 230 as indicated at 404. In some embodiments, the packet may be sent onto the virtual network 210 if the packet target address is in the virtual network's private IP address space. In some embodiments, the packet may be sent onto the virtual network 210 if the packet target address is reachable according to routing information of the virtual network 210, for example if the packet target address is within another private IP address space reachable via the virtual network 210 according to virtual network 210 routing information. As indicated at 406, the packet may be sent to the target endpoint via the virtual network 210. In some embodiments, security and access control 216 may be applied to the packet by the virtual network 210 when routing the packet. At 402 of FIG. 4, if the packet target address is not reachable via the virtual network 210, then the packet may be sent to a target endpoint via the provider network 200, as indicated at 420.

For example, in some embodiments as shown in FIG. 2, PN resource instance 222 may generate IP packets including packets indicating the VN private IP address of VN resource instance 212 on virtual network 210 as an endpoint. VMM 260A may obtain the IP packets and apply mapping information 226 to determine endpoints of the packets. IP packets that are targeted at endpoints that are not reachable via virtual network 210 according to the mapping information 226 may be sent onto the provider network 200 for routing via provider network 200 to respective endpoints 264. IP packets that are targeted at endpoints that are reachable via virtual network 210 according to the mapping information 226, including but not limited to packets that specify IP addresses within the virtual network 210's private IP address space and packets that specify IP addresses within other private IP address spaces reachable via the virtual network 210 according to the mapping information 226, may be sent through the virtual private IP link 230 onto the virtual network 210 for routing via the virtual network 210 to respective endpoints. On the virtual network 210, IP packets from linked PN resource instance 222 that are targeted at VN resource instance 212 may be routed to VN resource instance 212 via virtual network 210. Security and access control 216 rules may be applied to the packet by the virtual network 210 when routing the packet. In some embodiments, VMM 250B on a host device that includes the target VN resource instance 212 may map the VN private IP network address of the IP packets to the PN private IP address of the VM corresponding to the target VN resource instance 212 on the host device.

FIG. 5 is a high-level flowchart of a method for sending packets from a virtual network to a PN resource instance via a private IP link, according to at least some embodiments. As indicated at 500 of FIG. 5, a VN resource instance 212 generates and sends an IP packet onto the virtual network 210 on provider network 200. At 502 of FIG. 5, if the packet is addressed to a linked PN resource instance 222 private IP address, then the packet is routed to the PN resource instance via the virtual network 210 and according to the virtual network security and access control 216 rules, as indicated at 504. At 502 of FIG. 5, if the packet is not addressed to a linked PN resource instance 222 private IP address, then the packet is routed to a respective target endpoint via the virtual network 210, as indicated at 520.

For example, in some embodiments as shown in FIG. 2, once PN resource instance 222 is linked to virtual network 210, the PN private IP address of the linked PN resource instance 222 may appear as an endpoint on the virtual network 210, and VN resource instances 212 may communicate with the linked PN resource instance via private IP over the virtual network 210 according to virtual network 210 security and access control 216 rules. Thus, IP packets sent from VN resource instance 212 that indicate the PN private IP address of the linked PN resource instance 222 may be routed to the linked PN resource instance 222 via the virtual network 210 according to security and access control 216 rules. However, the linked PN resource instance is not actually provisioned in the virtual network 210 as a VN resource instance, and may still communicate with other endpoints 264 on provider network 200 or external to provider network 200 without going through virtual network 210 security and access control 216.

As shown in FIG. 2, IP packets sent from VN resource instance 212 that indicate other virtual network IP addresses may be routed to other VN endpoints 270 via the virtual network 210 according to security and access control 216 rules. IP packets sent from VN resource instance 212 that indicate public IP addresses may be routed to a public-facing gateway 214 of virtual network 210.

Accessing Services Via a Private IP Link to a Virtual Network

Figure 6:
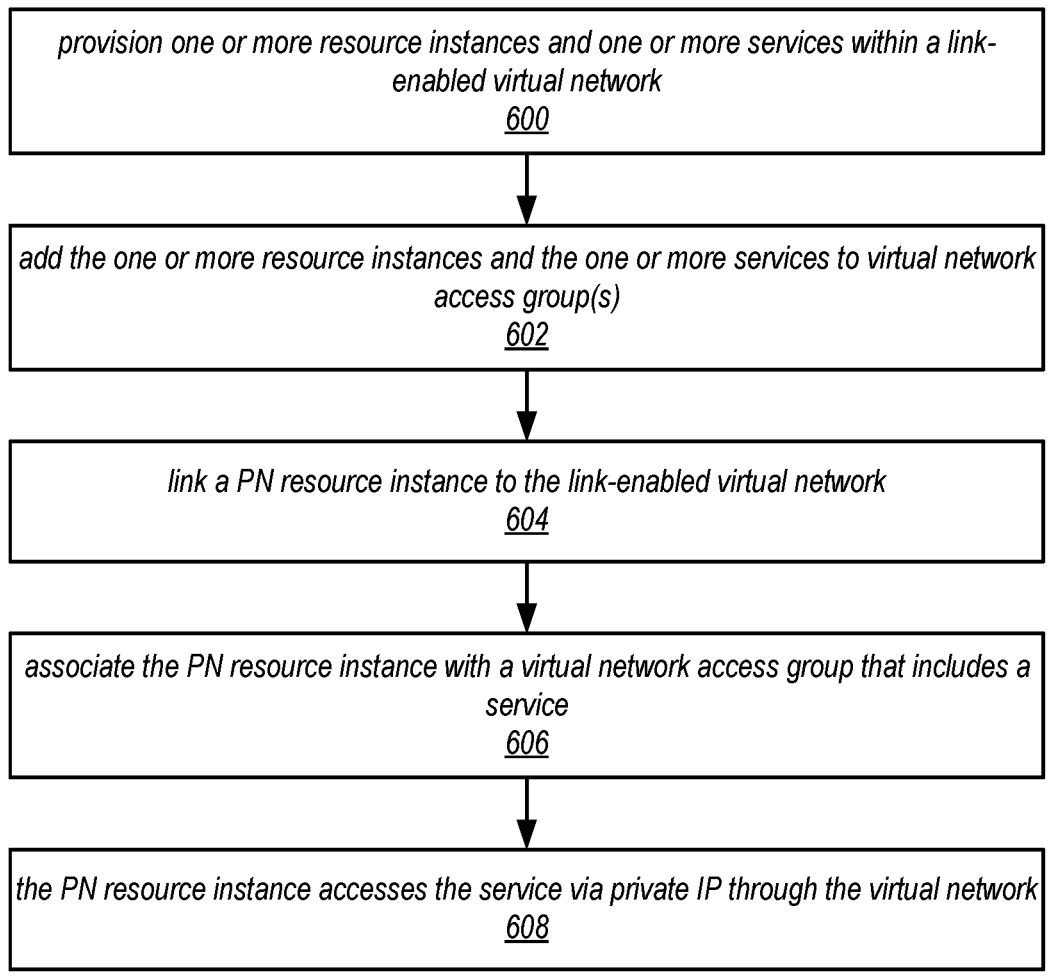
FIG. 6 is a high-level flowchart of a method for accessing a provider network service from a provider network resource instance via a private IP link to a virtual network, according to at least some embodiments.

In some embodiments, a private IP link established via the private IP link service may allow the client's linked PN resource instances to access various provider network services in or via the client's virtual network, including but not limited to database services, load balancer services, data warehousing services, and caching services, through private IP addressing. FIG. 6 is a high-level flowchart of a method for accessing a provider network service from a provider network resource instance via a private IP link to a virtual network, according to at least some embodiments. As indicated at 600, a client may provision one or more resource instances and one or more instances of or interfaces to provider network services within a link-enabled virtual network. As indicated at 602, the client may add the one or more resource instances and one or more services to virtual access groups on the virtual network to control access to the respective instances and services. As indicated at 604, a PN resource instance may be linked to the link-enabled virtual network. As indicated at 606, the PN resource instance may be associated with an access group that includes a virtual network implementation of a particular provider network service. As indicated at 608, the PN resource instance may then access the service via private IP through the virtual network.

Example Provider Network Services and APIs

Figure 7:
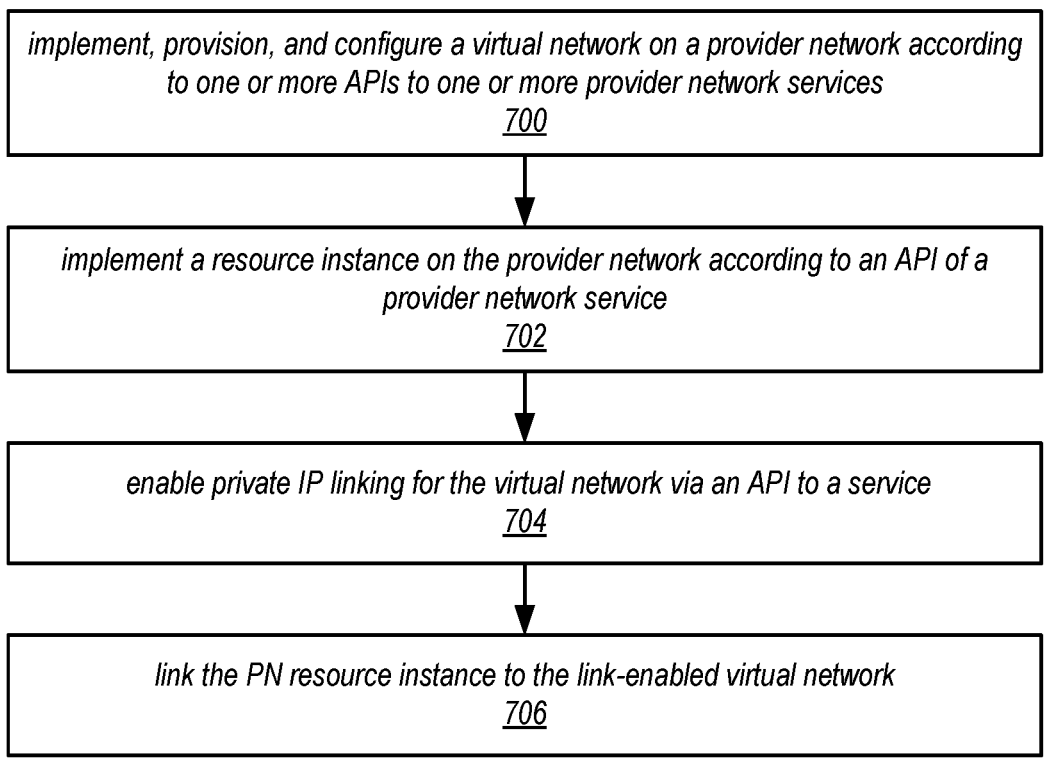
FIG. 7 is a high-level flowchart of a method for establishing private IP links between provider network resource instances and virtual networks on the provider network, according to at least some embodiments.

FIG. 7 is a high-level flowchart of a method for establishing private IP links between provider network resource instances and virtual networks on the provider network, according to at least some embodiments. In some embodiments of a provider network, one or more provider network services and one or more APIs may be leveraged to implement client virtual networks and client resource instances within a provider network, to enable private IP linking for the virtual network, and to link the client resource instances to the client virtual network.

As indicated at 700 of FIG. 7, a client may implement, provision, and configure a virtual network on a provider network according to one or more APIs to one or more provider network services. In some embodiments, the provider network service(s) may be leveraged to implement the client virtual network on the provider network according to input obtained from the client via the APIs. In some embodiments, the virtual network contains one or more resource instances. In some embodiments, the virtual network is configured to route IP packets to IP addresses within the virtual network according to a private Internet Protocol (IP) address space of the virtual network.

As indicated at 702 of FIG. 7, the client may implement a client resource instance on the provider network according to an API of a provider network service. In some embodiments, the provider network service(s) may be leveraged to implement the client resource instance on the provider network according to input obtained from the client via the APIs. In some embodiments, the client resource instance may be assigned a private IP address within a private IP address space of the provider network.

As indicated at 704 of FIG. 7, the client may enable private IP linking for the virtual network via an API to a service. In some embodiments, the provider network service(s) may be leveraged to enable private IP linking for the client virtual network according to input obtained from the client via the APIs. In some embodiments, to enable private IP linking for the virtual network, the service(s) configure the client virtual network to also route IP packets on the virtual network to private IP addresses within the private IP address space of the provider network. In some embodiments, the virtual network may implement one or more virtual access groups each including one or more virtual network resource instances, and linking the client resource instance to the client virtual network may include adding the client resource instance to at least one of the virtual network access groups. In some embodiments, the virtual network implements one or more route tables configured for routing IP packets on the virtual network, and enabling private IP linking for the virtual network adds a route to the one or more route tables for routing IP packets on the virtual network to private IP addresses within the private IP address space of the provider network.

As indicated at 706 of FIG. 7, the client may link the provider network (PN) resource instance to the link-enabled virtual network. In some embodiments, the provider network service(s) may be leveraged to link the client resource instance to the client virtual network according to additional input obtained from the client via the APIs. In some embodiments, in linking the PN resource instance to the virtual network, the provider network private IP address of the client resource instance is added to security and access control of the virtual network so that the client resource instance can access one or more of the virtual network resource instances according to private IP. In some embodiments, linking the PN resource instance to the virtual network modifies a virtual machine monitor (VMM) that fronts the PN resource instance on a host device to send packets targeted at the virtual network address space onto the virtual network for routing by the virtual network, while also sending other packets that are not targeted at the virtual network to endpoints via the network substrate of the provider network.

FIG. 8 illustrates services and APIs in a provider network environment, according to at least some embodiments. The provider network services 106 and APIs 108 may, for example, be used to establish and configure a virtual network 110 including VN resource instances 112 on a provider network 100. The services 106 and APIs 108 may also be used to provision PN resource instances 122A and 122B on the provider network 100. In some embodiments, one or more of the provider network services 106 may provide a private IP link service that allows the client to establish private IP link(s) 130 and to link their PN resource instances 122 on the provider network 100 with their VN resource instances 112 provisioned in a virtual network 110 on the provider network 100 via private IP over the link(s) 130.

A client associated with client network 860 may establish, provision, and manage a virtual network 110 on provider network 100 via APIs 108 of the services 106 accessed through a management console 864 on client network 860. In some embodiments, the APIs 108 may display an interface 870 on console 864 that provides one or more graphical and/or textual interface elements that allow the client to view, create, provision, and manage a virtual network 110 on the provider network 100. In some embodiments, to facilitate the establishment of a virtual network 110 on the provider network 100, the services 106 and APIs 108 may provide to the clients, via the interface elements of interface 870, one or more of, but not limited to, the following capabilities:
  Create virtual networks (e.g., client virtual network 110).
  Specify a private IP address space for the virtual network 110.
  Provision VN resource instances 112 within the virtual network 110.
  Create, manage, and modify access groups, access control rules, and other security features for the virtual network 110 and for resource instances 112 within the virtual network.
  Enable private IP linking for the virtual network 110.

In some embodiments, to facilitate private IP links between virtual networks and PN resource instances, the services 106 and APIs 108 may provide to the clients, via the interface elements of interface 870, one or more of, but not limited to, the following capabilities:
  Establish a private IP link 130 from the virtual network 110 address space to the provider network private IP address space for the client.
  Link specific client PN resource instances 122 (e.g., resource instance 122A) on the provider network 100 with VN resource instances 112 in the virtual network 110 via private IP over the link 130.
  Specify access control for the linked PN resource instance 122A's for accesses to endpoints via the virtual network 110, for example by adding the PN resource instance 122A to one or more virtual access groups or modifying one or more network ACLs.

FIG. 8 shows a non-limiting example of a graphical and/or textual interface 870 that may be displayed at a client's console 864. The interface 870 may show a graphical and/or textual representation of the client's virtual network 110, and graphical and/or textual representations of VN resource instances 112 in the virtual network 110. Graphical and/or textual representations of network elements, security and access control components or elements (e.g., access groups and subnets as illustrated in FIGS. 12 and 13), and other virtual network components may also be displayed. Graphical and/or textual representations of security and access control rules (e.g., virtual network access control rules as illustrated in FIGS. 7A and 7B) may also be displayed. In some embodiments, graphical and/or textual representations of the client's PN resource instances 122 on the provider network 100 may be displayed, as well as graphical and/or textual representations of private IP link(s) 130 between the PN resource instance(s) 122 and the virtual network 110.

A client may, for example, use a cursor control device to select various interface elements provided by interface 870 to, for example, create and provision virtual networks (e.g., client virtual network 110), create and provision resources within virtual networks (e.g., VN resource instances 112 within client virtual network 110), create, manage, and modify access control rules, access groups, and so on for virtual networks and for resources within virtual networks, enable resource linking to virtual networks, and establish links between PN resource instances 122 and link-enabled virtual networks. The interface 870 may include other user interface elements, for example menu or other elements that allow the client to select from among various ones of the client's virtual networks, elements to select, create, configure, and manage the client's resources within virtual networks and the client's other resources on the provider network, and so on.

In some embodiments, the services 106 may include a virtual network service that allows the client to establish, configure, provision, and manage a virtual network 110 on the provider network 100. In some embodiments, the services 106 may include a computation resource service (also referred to as a hardware virtualization service) that allows the client to provision and configure PN resource instances 122 on provider network. In some embodiments, to link a PN resource instance 122 to a virtual network 110 may be performed in two steps. First, the client enables resource linking for a given virtual network 110. Next, the client associates a desired virtual network access group from the virtual network 110 with the PN resource instance 122 (instance 122A, in this example) to be linked to the virtual network 110. In some embodiments, to link a PN resource instance 122 to a virtual network 110 from a console 864, the client first selects a target virtual network 110 via an API 108 to the virtual network service on the interface 870 and selects "Enable resource linking" for the virtual network 110 as shown in FIG. 8. Next, via an API 108 to the computation resource service, the client selects a PN resource instance 122 (instance 122A, in this example) to be linked to a virtual network 110; one or more access groups from one or more link-enabled virtual networks 110 may be displayed, for example in a menu user interface element. The client may then select a desired access group from a link-enabled virtual network 110 to which the PN resource instance 122A is to be linked.

In some embodiments, instead of or in addition to providing a graphical interface via console 864 for linking a PN resource instance 122 to a virtual network 110, a provider network may provide a command line interface (CLI) to the provider network services 106 via which a client may link a PN resource instance 122 to a virtual network 110. For example, in some embodiments, the client may enable resource linking for a specified virtual network 110 with a first CLI command, and may then link a specified PN resource instance 122A to the virtual network 110 with a second CLI command.

Example Provider Network Environments

This section describes example provider network environments in which embodiments of the methods and apparatus for linking resource instances to virtual networks as described in reference to FIGS. 1 through 8 may be implemented. However, these example provider network environments are not intended to be limiting.

FIG. 9 illustrates an example provider network environment, according to at least some embodiments. A provider network 900 may provide resource virtualization to clients via one or more virtualization services 910 that allow clients to purchase, rent, or otherwise obtain instances 912 of virtualized resources, including but not limited to computation and storage resources, implemented on devices within the provider network or networks in one or more data centers. Private IP addresses 916 may be associated with the resource instances 912; the private IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that clients may obtain from the provider 900.

Conventionally, the provider network 900, via the virtualization services 910, may allow a client of the service provider (e.g., a client that operates client network 950A) to dynamically associate at least some public IP addresses 914 assigned or allocated to the client with particular resource instances 912 assigned to the client. The provider network 900 may also allow the client to remap a public IP address 914, previously mapped to one virtualized computing resource instance 912 allocated to the client, to another virtualized computing resource instance 912 that is also allocated to the client. Using the virtualized computing resource instances 912 and public IP addresses 914 provided by the service provider, a client of the service provider such as the operator of client network 950A may, for example, implement client-specific applications and present the client's applications on an intermediate network 940, such as the Internet. Other network entities 920 on the intermediate network 940 may then generate traffic to a destination public IP address 914 published by the client network 950A; the traffic is routed to the service provider data center, and at the data center is routed, via a network substrate, to the private IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all resource instance types.

At least some public IP addresses may be allocated to or obtained by clients of the provider network 900; a client may then assign their allocated public IP addresses to particular resource instances allocated to the client. These public IP addresses may be referred to as client public IP addresses, or simply client IP addresses. Instead of being assigned by the provider network 900 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 10:
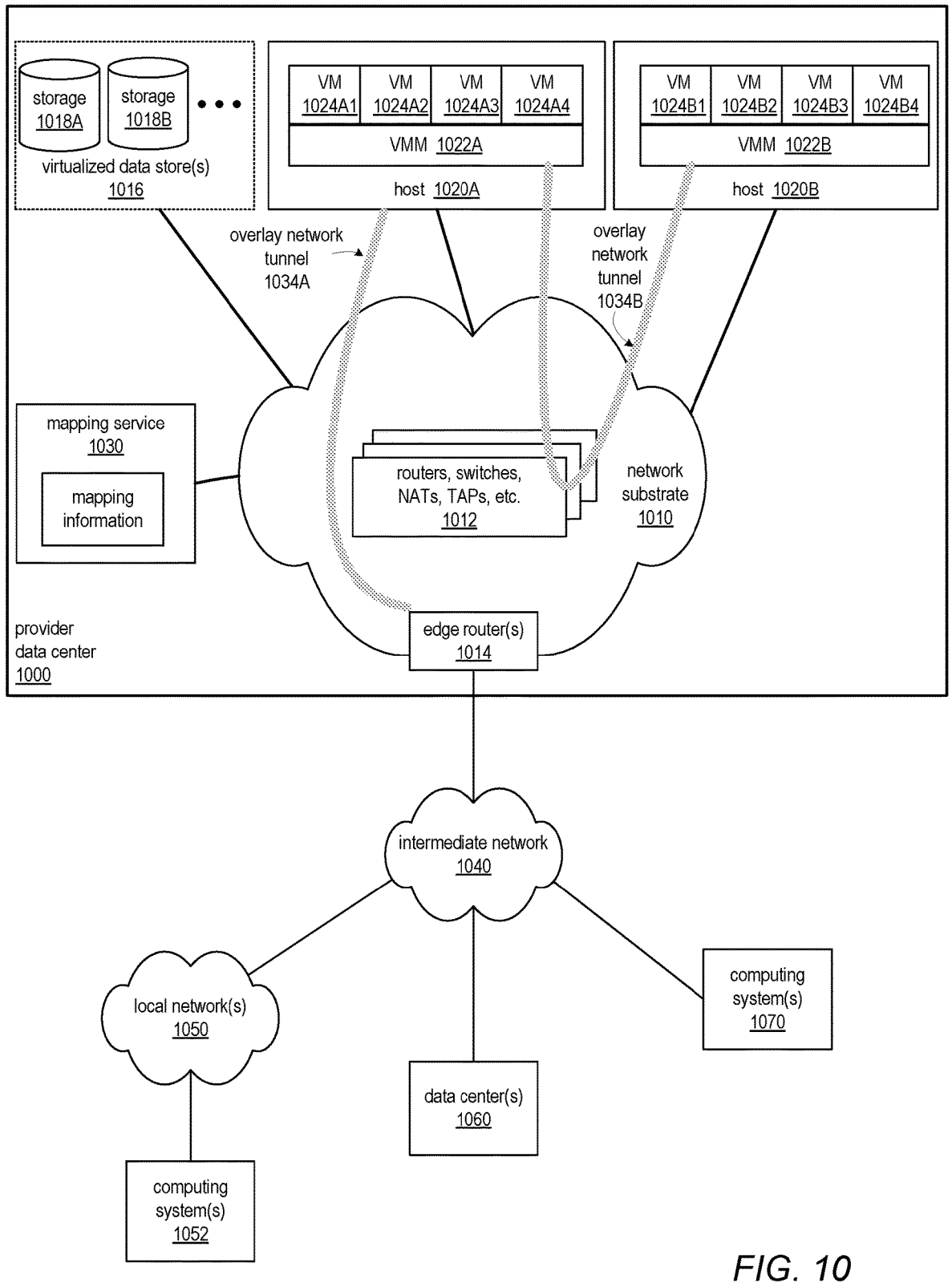
FIG. 10 illustrates an example data center that implements an overlay network on a network substrate using IP tunneling technology, according to some embodiments.

FIG. 10 illustrates an example data center that implements an overlay network on a network substrate using IP tunneling technology, according to at least some embodiments. A provider data center 1000 may include a network substrate that includes networking devices 1012 such as routers, switches, network address translators (NATs), and so on. At least some embodiments may employ an Internet Protocol (IP) tunneling technology to provide an overlay network via which encapsulated packets may be passed through network substrate 1010 using tunnels. The IP tunneling technology may provide a mapping and encapsulating system for creating an overlay network on a network (e.g., a local network in data center 1000 of FIG. 10) and may provide a separate namespace for the overlay layer (the public IP addresses) and the network substrate 1010 layer (the private IP addresses). Packets in the overlay layer may be checked against a mapping directory (e.g., provided by mapping service 1030) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 1030) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 10, an example overlay network tunnel 1034A from a virtual machine (VM) 1024A on host 1020A to a device on the intermediate network 1050 and an example overlay network tunnel 1034B between a VM 1024B on host 1020B and a VM 1024C on host 1020C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 10, at least some networks in which embodiments may be implemented may include hardware virtualization technology that enables multiple operating systems to run concurrently on a host computer (e.g., hosts 1020A and 1020B of FIG. 10), i.e. as virtual machines (VMs) 1024 on the hosts 1020. The VMs 1024 may, for example, be rented or leased to clients of a network provider. A hypervisor, or virtual machine monitor (VMM) 1022, on a host 1020 presents the VMs 1024 on the host with a virtual platform and monitors the execution of the VMs 1024. Each VM 1024 may be provided with one or more private IP addresses; the VMM 1022 on a host 1020 may be aware of the private IP addresses of the VMs 1024 on the host. A mapping service 1030 may be aware of all network IP prefixes and the IP addresses of routers or other devices serving IP addresses on the local network. This includes the IP addresses of the VMMs 1022 serving multiple VMs 1024. The mapping service 1030 may be centralized, for example on a server system, or alternatively may be distributed among two or more server systems or other devices on the network. A network may, for example, use the mapping service technology and IP tunneling technology to, for example, route data packets between VMs 1024 on different hosts 1020 within the data center 1000 network; note that an interior gateway protocol (IGP) may be used to exchange routing information within such a local network.

In addition, a network such as the provider data center 1000 network (which is sometimes referred to as an autonomous system (AS)) may use the mapping service technology, IP tunneling technology, and routing service technology to route packets from the VMs 1024 to Internet destinations, and from Internet sources to the VMs 1024. Note that an external gateway protocol (EGP) or border gateway protocol (BGP) is typically used for Internet routing between sources and destinations on the Internet. FIG. 10 shows an example provider data center 1000 implementing a network that provides resource virtualization technology and that provides full Internet access via edge router(s) 1014 that connect to Internet transit providers, according to at least some embodiments. The provider data center 1000 may, for example, provide clients the ability to implement virtual computing systems (VMs 1024) via a hardware virtualization service and the ability to implement virtualized data stores 1016 on storage resources 1018 via a storage virtualization service.

The data center 1000 network may implement IP tunneling technology, mapping service technology, and a routing service technology to route traffic to and from virtualized resources, for example to route packets from the VMs 1024 on hosts 1020 in data center 1000 to Internet destinations, and from Internet sources to the VMs 1024. Internet sources and destinations may, for example, include computing systems 1070 connected to the intermediate network 1040 and computing systems 1052 connected to local networks 1050 that connect to the intermediate network 1040 (e.g., via edge router(s) 1014 that connect the network 1050 to Internet transit providers). The provider data center 1000 network may also route packets between resources in data center 1000, for example from a VM 1024 on a host 1020 in data center 1000 to other VMs 1024 on the same host or on other hosts 1020 in data center 1000.

A service provider that provides data center 1000 may also provide additional data center(s) 1060 that include hardware virtualization technology similar to data center 1000 and that may also be connected to intermediate network 1040. Packets may be forwarded from data center 1000 to other data centers 1060, for example from a VM 1024 on a host 1020 in data center 1000 to another VM on another host in another, similar data center 1060, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1018, as virtualized resources to clients of a network provider in a similar manner.

FIG. 11 is a block diagram of an example provider network that provides a storage virtualization service and a hardware virtualization service to clients, according to at least some embodiments. Hardware virtualization service 1120 provides multiple computation resources 1124 (e.g., VMs) to clients. The computation resources 1124 may, for example, be rented or leased to clients of the provider network 1100 (e.g., to a client that implements client network 1150). Each computation resource 1124 may be provided with one or more private IP addresses. Provider network 1100 may be configured to route packets from the private IP addresses of the computation resources 1124 to public Internet destinations, and from public Internet sources to the computation resources 1124.

Provider network 1100 may provide a client network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a client network 1150 may access functionality provided by the hardware virtualization service 1120, for example via a console 1194. In at least some embodiments, at the provider network 1100, each virtual computing system 1192 at client network 1150 may correspond to a computation resource 1124 that is leased, rented, or otherwise provided to client network 1150.

From an instance of a virtual computing system 1192 and/or another client device 1190 or console 1194, the client may access the functionality of storage virtualization service 1110, for example via one or more APIs 1102, to access data from and store data to a virtual data store 1116 provided by the provider network 1100. In some embodiments, a virtualized data store gateway (not shown) may be provided at the client network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In at least some embodiments, a user, via a virtual computing system 1192 and/or on another client device 1190, may mount and access virtual data store 1116 volumes, which appear to the user as local virtualized storage 1198.

While not shown in FIG. 11, the virtualization service(s) may also be accessed from resource instances within the provider network 1100 via API(s) 1102. For example, a client, appliance service provider, or other entity may access a virtualization service from within a respective virtual network on the provider network 1100 via an API 1102 to request allocation of one or more resource instances within the virtual network or within another virtual network.

FIG. 12 illustrates an example provider network that provides virtual networks on the provider network to at least some clients, according to at least some embodiments. A client's virtualized virtual network 1260 on a provider network 1200, for example, enables a client to connect their existing infrastructure (e.g., devices 1252) on client network 1250 to a set of logically isolated resource instances (e.g., VMs 1224A and 1224B and storage 1218A and 1218B), and to extend management capabilities such as security services, firewalls, and intrusion detection systems to include their resource instances.

A client's virtualized virtual network 1260 may be connected to a client network 1250 via a private communications channel 1242. A private communications channel 1242 may, for example, be a tunnel implemented according to a network tunneling technology or some other technology over an intermediate network 1240. The intermediate network may, for example, be a shared network or a public network such as the Internet. Alternatively, a private communications channel 1242 may be implemented over a direct, dedicated connection between virtualized virtual network 1260 and client network 1250.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a client network.

To establish a virtualized virtual network 1260 for a client on provider network 1200, one or more resource instances (e.g., VMs 1224A and 1224B and storage 1218A and 1218B) may be allocated to the virtualized virtual network 1260. Note that other resource instances (e.g., storage 1218C and VMs 1224C) may remain available on the provider network 1200 for other client usage. A range of public IP addresses may also be allocated to the virtualized virtual network 1260. In addition, one or more networking devices (routers, switches, etc.) of the provider network 1200 may be allocated to the virtualized virtual network 1260. A private communications channel 1242 may be established between a private gateway 1262 at virtualized virtual network 1260 and a gateway 1256 at client network 1250.

In at least some embodiments, in addition to, or instead of, a private gateway 1262, virtualized virtual network 1260 may include a public gateway 1264 that enables resources within virtualized virtual network 1260 to communicate directly with entities (e.g., network entity 1244) via intermediate network 1240, and vice versa, instead of or in addition to via private communications channel 1242.

Virtualized virtual network 1260 may be, but is not necessarily, subdivided into two or more subnetworks, or subnets, 1270. For example, in implementations that include both a private gateway 1262 and a public gateway 1264, the virtual network may be subdivided into a subnet 1270A that includes resources (VMs 1224A and storage 1218A, in this example) reachable through private gateway 1262, and a subnet 1270B that includes resources (VMs 1224B and storage 1218B, in this example) reachable through public gateway 1264.

The client may assign particular client public IP addresses to particular resource instances in virtualized virtual network 1260. A network entity 1244 on intermediate network 1240 may then send traffic to a public IP address published by the client; the traffic is routed, by the provider network 1200, to the associated resource instance. Return traffic from the resource instance is routed, by the provider network 1200, back to the network entity 1244 over intermediate network 1240. Note that routing traffic between a resource instance and a network entity 1244 may require network address translation to translate between the public IP address and the private IP address of the resource instance.

At least some embodiments may allow a client to remap public IP addresses in a client's virtualized virtual network 1260 as illustrated in FIG. 12 to devices on the client's external network 1250. When a packet is received (e.g., from network entity 1244), the network 1200 may determine that the destination IP address indicated by the packet has been remapped to an endpoint on external network 1250 and handle routing of the packet to the respective endpoint, either via private communications channel 1242 or via the intermediate network 1240. Response traffic may be routed from the endpoint to the network entity 1244 through the provider network 1200, or alternatively may be directly routed to the network entity 1244 by the client network 1250. From the perspective of the network entity 1244, it appears as if the network entity 1244 is communicating with the public IP address of the client on the provider network 1200. However, the network entity 1244 has actually communicated with the endpoint on client network 1250.

While FIG. 12 shows network entity 1244 on intermediate network 1240 and external to provider network 1200, a network entity may be an entity on provider network 1200. For example, one of the resource instances provided by provider network 1200 may be a network entity that sends traffic to a public IP address published by the client.

FIG. 13 illustrates subnets and access groups in an example virtual network implementation on a provider network, according to at least some embodiments. In at least some embodiments, a provider network such as provider network 1200 in FIG. 12 may allow the client to establish and manage virtual access groups 1316 within the client's virtual network 1310, within or across subnets 1314. An access group 1316 acts as a firewall that controls the traffic allowed to reach one or more resource instances 1318 within the access group 1316. The client may establish one or more access groups 1316 within the virtual network 1310, and may associate each resource instance 1318 in the virtual network 1310 with one or more of the access groups 1316. In at least some embodiments, the client may establish and/or modify rules for each access group 1316 that control the inbound traffic allowed to reach the resource instances 1318 associated with the access group 1316.

In the example virtual network 1310 shown in FIG. 13, the virtual network 1310 is subdivided into two subnets 1314A and 1314B. Access to the virtual network 1310 is controlled by gateway(s) 1330. Each subnet 1314 may include at least one router 1312 that acts to route traffic to (and from) resource instances 1318 on the respective subnet 1314. In some embodiments, network access control lists (ACLs) may be used to control access to the subnets 1314 at router(s) 1312. In the example shown in FIG. 13, resource instances 1318A through 1318E are on subnet 1314A, and resource instances 1318F through 1318) are on subnet 1314B. The client has established four access groups 1316A through 1316D. As shown in FIG. 13, an access group may extend across subnets 1314, as does access group 1316A that includes resource instances 1318A and 1318B on subnet 1314A and resource instance 1318F on subnet 1314B. In addition, a resource instance 1318 may be included in two or more access groups 1316; for example, resource instance 1318A is included in access groups 1316A and 1316B.

In some embodiments, the provider network may provide private IP linking functionality that allows virtual network access groups 1316 to include provider network resource instances that are not in the virtual network 1310 as members. For example, as shown in FIG. 13, PN resource instance 1322 has been added to access group 1316A, so resource instance 1322 can communicate with resource instances 1318A and 1318B on subnet 1314B and resource instance 1318F on subnet 1314B.

Illustrative System

Figure 14:
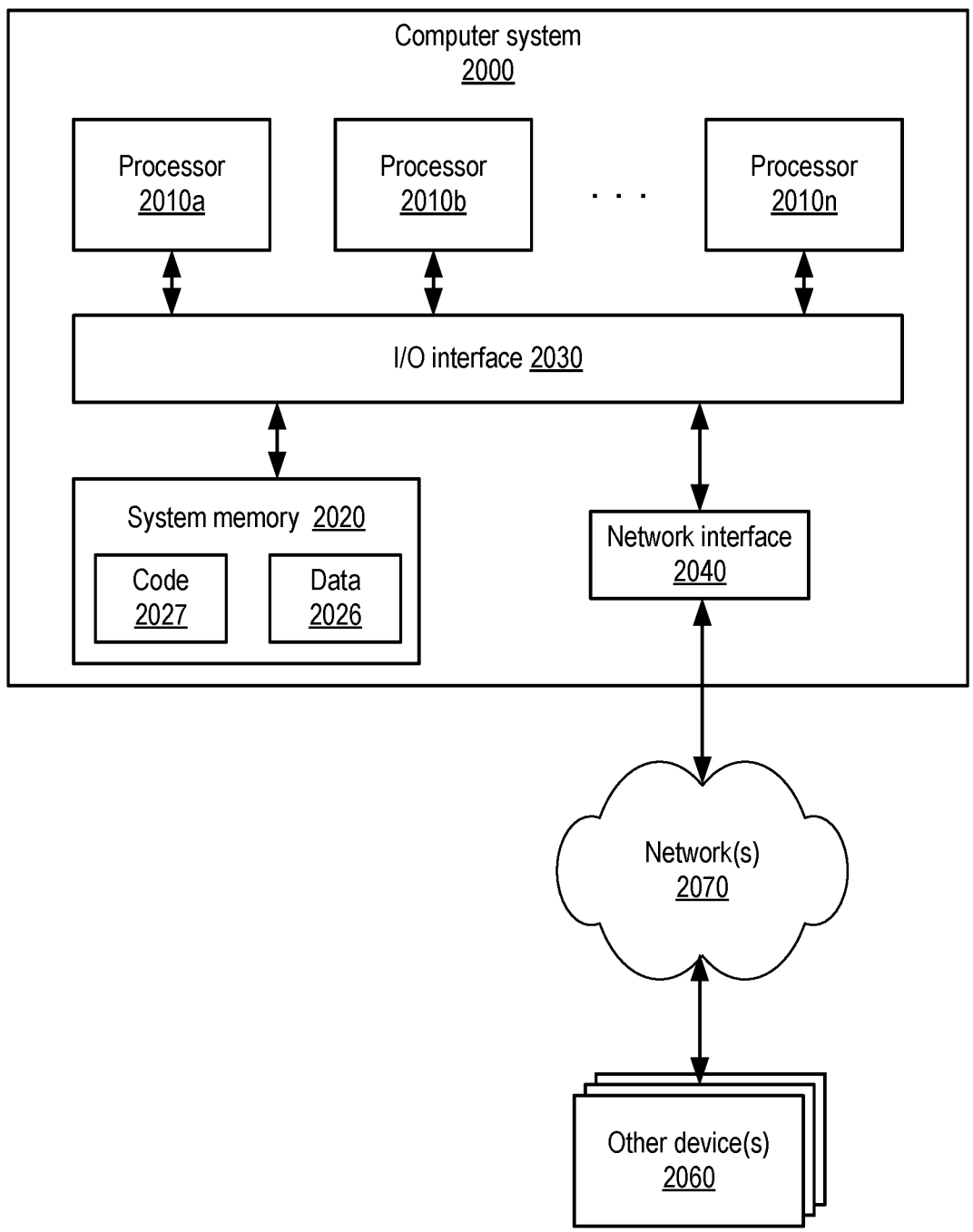
FIG. 14 is a block diagram illustrating an example computer system that may be used in some embodiments.

In at least some embodiments, a server that implements a portion or all of the methods and apparatus for linking resource instances to virtual networks in provider network environments as described herein may include a general-purpose computer system that includes or is configured to access one or more computer-accessible media, such as computer system 2000 illustrated in FIG. 14. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for linking resource instances to virtual networks in provider network environments, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north link and a south link, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 13, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 13 for implementing embodiments of methods for linking resource instances to virtual networks in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
   linking a client resource of a provider network to one or more resources of a client virtual network within the provider network, wherein the client resource is outside the client virtual network and accessible via a network address of the provider network, wherein prior to the linking the one or more resources of the client virtual network are isolated from resources, including the client resource, of the provider network, wherein the linking is performed responsive to receiving input, via an application programming interface (API) of one or more APIs provided to clients of the provider network from one of the clients external to the provider network, and wherein the linking comprises:
      configuring the client virtual network to route particular network packets between the one or more resources and the client resource in the provider network according to a private network address assigned to the client resource and accessible by the client virtual network, wherein the private network address is different from the network address; and
      modifying a security control of the client virtual network to allow the client resource to access the one or more resources, the modifying comprising adding the private network address to an access control list of the client virtual network;
   wherein subsequent to the linking, the client resource is accessible to the one or more resources of the client virtual network via the private network address without using the network address and is accessible outside the client virtual network via the network address of the provider network.

2. The method as recited in claim 1, wherein the client virtual network implements one or more client virtual network access groups each including at least one of the one or more resources in the client virtual network, and wherein the linking the client resource to the client virtual network comprises adding the client resource to at least one of the client virtual network access groups such that the linked client resource can access the one or more resources in the at least one of the client virtual network access groups to which it is added.

3. The method as recited in claim 1, wherein at least one of the one or more resources in the client virtual network corresponds to an implementation of a provider network service.

4. The method as recited in claim 1, wherein the client resource is implemented on a host machine in the provider network, the host machine comprising a monitor, and wherein the method further comprises performing, by the monitor to subsequent to the linking:
   obtaining a plurality of network packets, including a particular network packet of the particular network packets, from the client resource, each network packet indicating a target network address;
   determining that the target network address of the particular network packet is a network address accessible via the client virtual network and send the particular network packet to the client virtual network for routing via the client virtual network to a respective resource of the one or more resources; and
   determining that the target address of at least one other network packet of the plurality of network packets is a network address that is not accessible via a private network address space of the client virtual network and send the at least one other network packet to a respective resource via the provider network.

5. The method as recited in claim 1, wherein the configuring comprises configuring the client virtual network to route one or more of the particular network packets, each indicating the private network address of the client resource as a target network address, from respective ones of the one or more of resources to the client resource.

6. The method as recited in claim 1, wherein:
   the client virtual network implements one or more route tables configured for routing the particular network packets on the client virtual network; and
   the configuring comprises adding a route to the one or more route tables for routing the particular network packets to private network addresses on the provider network via the client virtual network.

7. The method as recited in claim 1, further comprising:
   routing, by the client virtual network, one or more of the particular network packets, each indicating the private network address of the client resource as a target network address, from respective ones of the one or more resources in the client virtual network to the client resource.

8. One or more non-transitory computer-readable storage media storing program instructions that when executed on or across one or more processors cause the one or more processors to implement:

linking a client resource of a provider network to one or more resources of a client virtual network within the provider network, wherein the client resource is outside the client virtual network and accessible via a network address of the provider network, wherein prior to the linking the one or more resources of the client virtual network are isolated from resources, including the client resource, of the provider network, wherein the linking is performed responsive to receiving input, via an application programming interface (API) of one or more APIs provided to clients of the provider network from one of the clients external to the provider network, and wherein the linking comprises:

configuring the client virtual network to route particular network packets between the one or more resources and the client resource in the provider network according to a private network address assigned to the client resource and accessible by the client virtual network, wherein the private network address is different from the network address; and modifying a security control of the client virtual network to allow the client resource to access the one or more resources, the modifying comprising adding the private network address to an access control list of the given client virtual network;

wherein subsequent to the linking, the client resource is accessible to the one or more resources of the client virtual network via the private network address without using the network address and is accessible outside the client virtual network via the network address of the provider network.

9. The one or more non-transitory computer-readable storage media as recited in claim 8, wherein the client virtual network implements one or more client virtual network access groups each including at least one of the one or more resources in the client virtual network, and wherein the linking the client resource to the client virtual network comprises adding the client resource to at least one of the client virtual network access groups such that the linked client resource can access the one or more resources in the at least one of the client virtual network access groups to which it is added.

10. The one or more non-transitory computer-readable storage media as recited in claim 8, wherein at least one of the one or more resources in the client virtual network corresponds to an implementation of a provider network service.

11. The one or more non-transitory computer-readable storage media as recited in claim 8, wherein the client resource is implemented on a host machine in the provider network, the host machine comprising a monitor, and wherein additional program instructions, stored at the one or more non-transitory computer-readable storage media, that when executed on or across the one or more processors cause the one or more processors to further implement:

obtaining a plurality of network packets, including a particular network packet of the particular network packets, from the client resource, each network packet indicating a target network address;

determining that the target network address of the particular network packet is a network address accessible via the client virtual network and send the particular network packet to the client virtual network for routing via the client virtual network to a respective resource of the one or more resources; and determining that the target address of at least one other network packet of the plurality of network packets is a network address that is not accessible via a private network address space of the client virtual network and send the at least one other network packet to a respective resource via the provider network.

12. The one or more non-transitory computer-readable storage media as recited in claim 8, wherein the configuring comprises configuring the client virtual network to route one or more of the particular network packets, each indicating the private network address of the client resource as a target network address, from respective ones of the one or more of resources to the client resource.

13. The one or more non-transitory computer-readable storage media as recited in claim 8, wherein the client virtual network implements one or more route tables configured for routing the particular network packets on the client virtual network, and wherein the configuring comprises adding a route to the one or more route tables for routing the particular network packets to private network addresses on the provider network via the client virtual network.

14. The one or more non-transitory computer-readable storage media as recited in claim 8 storing additional program instructions that when executed on or across the one or more processors cause the one or more processors to further implement:

routing, by the client virtual network, one or more of the particular network packets, each indicating the private network address of the client resource as a target network address, from respective ones of the one or more resources in the client virtual network to the client resource.

15. A system, comprising:

a host device in a provider network, the host device comprising at least one processor and a memory and configured to:

link a client resource of a provider network to one or more resources of a client virtual network within the provider network, wherein the client resource is outside the client virtual network and accessible via a network address of the provider network, wherein prior to the linking the one or more resources of the client virtual network are isolated from resources, including the client resource, of the provider network, wherein the linking is performed responsive to receiving input, via an application programming interfaces (API) of one or more APIs provided to clients of the provider network from one of the clients external to the provider network, and wherein to link the client resource the host device is configured to:

configure the client virtual network to route particular network packets between the one or more resources and the client resource in the provider network according to a private network address assigned to the client resource and accessible by the client virtual network, wherein the private network address is different from the network address; and modify a security control of the client virtual network to allow the client resource to access the one or more resources, wherein to modify the security control the host device is configured to add the private network address to an access control list of the client virtual network;

wherein subsequent to the linking, the client resource is accessible to the one or more resources of the client virtual network via the private network address without using the network address and is accessible outside the client virtual network via the network address of the provider network.

16. The system as recited in claim 15, wherein the client virtual network implements one or more client virtual network access groups each including at least one of the one or more resources in the client virtual network, and wherein to link the client resource to the client virtual network the host device is configured to add the client resource to at least one of the client virtual network access groups such that the linked client resource can access the one or more resources in the at least one of the client virtual network access groups to which it is added.

17. The system as recited in claim 15, wherein at least one of the one or more resources in the client virtual network corresponds to an implementation of a provider network service.

18. The system as recited in claim 15, further comprising:
a host machine in the provider network, comprising at least one processor and a memory and implementing the client resource and a monitor, wherein the monitor is configured to:
obtain a plurality of network packets, including a particular network packet of the particular network packets, from the client resource, each network packet indicating a target network address;
determine that the target network address of the particular network packet is a network address accessible via the client virtual network and send the particular network packet to the client virtual network for routing via the client virtual network to a respective resource of the one or more resources; and
determine that the target address of at least one other network packet of the plurality of network packets is a network address that is not accessible via a private network address space of the client virtual network and send the at least one other network packet to a respective resource via the provider network.

19. The system as recited in claim 15, wherein to configure the client virtual network the host device is configured to configure the client virtual network to route one or more of the particular network packets, each indicating the private network address of the client resource as a target network address, from respective ones of the one or more of resources to the client resource.

20. The system as recited in claim 15, wherein the client virtual network implements one or more route tables configured for routing the particular network packets on the client virtual network, and wherein to configure the client virtual network the host device is configured to add a route to the one or more route tables for routing the particular network packets to private network addresses on the provider network via the client virtual network.

* * * * *